(12) United States Patent
Janampally et al.

(10) Patent No.: US 10,841,698 B1
(45) Date of Patent: Nov. 17, 2020

(54) VEHICLE SOUND SIMULATION BASED ON OPERATING AND ENVIRONMENTAL CONDITIONS

(71) Applicant: Toyota Motor Engineering & Manufacturing North America, Inc., Erlanger, KY (US)

(72) Inventors: Sandeep Kumar Reddy Janampally, Canton, MI (US); Alejandro M. Sanchez, Ann Arbor, MI (US); Monica Vanterpool, Ann Arbor, MI (US)

(73) Assignee: Toyota Motor Engineering and Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/531,193

(22) Filed: Aug. 5, 2019

(51) Int. Cl.
| | |
|---|---|
| *H04R 3/12* | (2006.01) |
| *H04R 1/40* | (2006.01) |
| *G10L 25/51* | (2013.01) |
| *H04R 29/00* | (2006.01) |
| *B60Q 9/00* | (2006.01) |
| *B60Q 5/00* | (2006.01) |
| *B60K 6/22* | (2007.10) |

(52) U.S. Cl.
CPC .............. *H04R 3/12* (2013.01); *B60Q 5/008* (2013.01); *B60Q 9/00* (2013.01); *G10L 25/51* (2013.01); *H04R 1/403* (2013.01); *H04R 29/002* (2013.01); *B60K 6/22* (2013.01); *B60Y 2200/92* (2013.01); *H04R 2499/13* (2013.01)

(58) Field of Classification Search
CPC . H04R 3/12; H04R 1/40; H04R 29/00; B06Q 5/00; B06Q 5/008; G10L 25/51; G10K 15/08

USPC ........................................................ 381/56, 86
See application file for complete search history.

(56) References Cited

U.S. PATENT DOCUMENTS

| | | | |
|---|---|---|---|
| 5,635,903 A | 6/1997 | Koike et al. | |
| 5,991,637 A * | 11/1999 | MacK, II | H04B 1/3805 455/563 |
| 8,712,615 B2 | 4/2014 | Omote et al. | |
| 8,798,287 B2 | 8/2014 | Lipp | |

(Continued)

FOREIGN PATENT DOCUMENTS

| | | |
|---|---|---|
| CN | 201721384 U | 1/2011 |
| CN | 106661980 A | 5/2017 |

(Continued)

OTHER PUBLICATIONS

Computerworld,"Audi creates sound for electric car," <youtube.com/watch?v=nY2wB_PCEm8>, retrieved Jun. 26, 2019, 3 pages.

(Continued)

*Primary Examiner* — Melur Ramakrishnaiah
(74) *Attorney, Agent, or Firm* — Jordan IP Law, LLC

(57) ABSTRACT

Methods and systems may provide for technology to identify one or more operating conditions associated with a vehicle. The technology may further identify an environmental condition associated with the vehicle. The technology may further control a first sound to be emitted from one or more of an internal audio system or an external audio system based on the one or more operating conditions and the environmental condition. The internal audio system projects sounds to a cabin of the vehicle. The external audio system projects sounds away from the vehicle.

20 Claims, 18 Drawing Sheets

(56) References Cited

U.S. PATENT DOCUMENTS

| | | | |
|---|---|---|---|
| 9,815,404 B2 | 11/2017 | Peachey et al. | |
| 10,065,561 B1 | 9/2018 | Bastyr et al. | |
| 2011/0010269 A1* | 1/2011 | Ballard | B60Q 5/008 705/26.41 |
| 2011/0254708 A1* | 10/2011 | Anderson | B60Q 5/008 340/988 |
| 2014/0056438 A1* | 2/2014 | Baalu | B60Q 5/008 381/86 |
| 2015/0139442 A1* | 5/2015 | Kreifeldt | G10K 15/02 381/86 |
| 2017/0222612 A1* | 8/2017 | Zollner | G08G 1/167 |
| 2017/0297486 A1* | 10/2017 | Magana | H04R 29/00 |
| 2018/0201185 A1 | 7/2018 | Tanaka | |
| 2018/0222384 A1* | 8/2018 | Dudar | B60W 10/06 |
| 2018/0281677 A1 | 10/2018 | Valeri et al. | |

FOREIGN PATENT DOCUMENTS

| | | |
|---|---|---|
| CN | 108394341 A | 8/2018 |
| CN | 108749712 A | 11/2018 |
| DE | 102012020780 A1 | 4/2014 |
| GB | 2509132 A | 6/2014 |

OTHER PUBLICATIONS

C. Perkins, "The Jaguar I-Pace's Artificial Whooshing Sounds Are Actually Useful," <roadandtrack.com/new-cars/car-technology/a21565258/jaguar-i-pace-active-sound-design>, retrieved Jun. 26, 2019, 7 pages.

Halosonic, "HALOsonic—Active Noise Management Solutions," <halosonic.co.uk>, retrieved Jun. 26, 2019, 12 pages.

Harman, "Harman facilitates the Electric Vehicle (r)evolution with HALOsonic," <youtube.com/watch?v=_gBi_rNGoQQ>, retrieved Jun. 26, 2019, 3 pages.

Jaguar, "Jaguar I-PACE | External Sound System," <youtube.com/watch?v=NzA6_zy0GXM>, retrieved Jun. 26, 2019, 3 pages.

Jaguar, "Jaguar I-PACE | Safety Sounds for the Visually Impaired," <youtube.com/watch?v=13JwfssNI3I>, retrieved Jun. 26, 2019, 3 pages.

Jaguar, "Sound Of Jaguar I-PACE Protects Road Users," </media.jaguar.com/news/2018/10/sound-jaguar-i-pace-protects-road-users>, retrieved Jun. 26, 2019, 8 pages.

Jaguar, "Why did Jaguar create the Audible Vehicle Alert System (AVAS) for the I-PACE?" <wildejaguarofsarasota.com/why-did-jaguar-create-the-audible-vehicle-alert-system-avas-for-the-i-pace>, retrieved Jun. 26, 2019, 3 pages.

S. O'Kane, "Here's the fake noise the Jaguar I-Pace makes when you hit the throttle," <theverge.com/tldr/2018/6/13/17460934/jaguar-i-pace-electric-car-sound>, retrieved Jun. 26, 2019, 3 pages, The Verge.

* cited by examiner

VEHICLE SOUND SIMULATION BASED ON OPERATING AND ENVIRONMENTAL CONDITIONS

TECHNICAL FIELD

Embodiments generally relate to vehicle sound emission. More particularly, embodiments relate to generating vehicle sounds to indicate a vehicle's approach.

BACKGROUND

Some vehicles may operate with reduced sound emission. For example, some vehicles may not include a combustion engine (e.g., an electric vehicle or hydrogen fuel cell car), may not always rely only on a combustion engine for power (e.g., a hybrid vehicle) or may turn a combustion engine on and off (e.g., an auto start-stop feature). The reduced sound emission may adversely affect some performance standards, such as safety and driveability perception.

BRIEF SUMMARY

In some embodiments, a vehicle comprises an internal audio system to project sounds to a cabin of the vehicle, an external audio system to project sounds away from the vehicle, and an audio controller that includes logic to control a first sound to be emitted from one or more of the internal audio system or the external audio system based on one or more operating conditions associated with the vehicle, and an environmental condition.

In some embodiments, at least one computer readable storage medium comprises a set of instructions, which when executed by an audio controller of a vehicle, causes the audio controller to identify one or more operating conditions associated with the vehicle, identify an environmental condition associated with the vehicle, and control a first sound to be emitted from one or more of an internal audio system or an external audio system based on the one or more operating conditions and the environmental condition, wherein the internal audio system is to project sounds to a cabin of the vehicle, further wherein the external audio system is to project sounds away from the vehicle.

Some embodiments include a method of controlling audio emission with an audio controller of a vehicle, the method includes identifying one or more operating conditions associated with the vehicle, identifying an environmental condition associated with the vehicle, and controlling a first sound to be emitted from one or more of an internal audio system or an external audio system based on the one or more operating conditions and the environmental condition, wherein the internal audio system is to project sounds to a cabin of the vehicle, further wherein the external audio system is to project sounds away from the vehicle.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
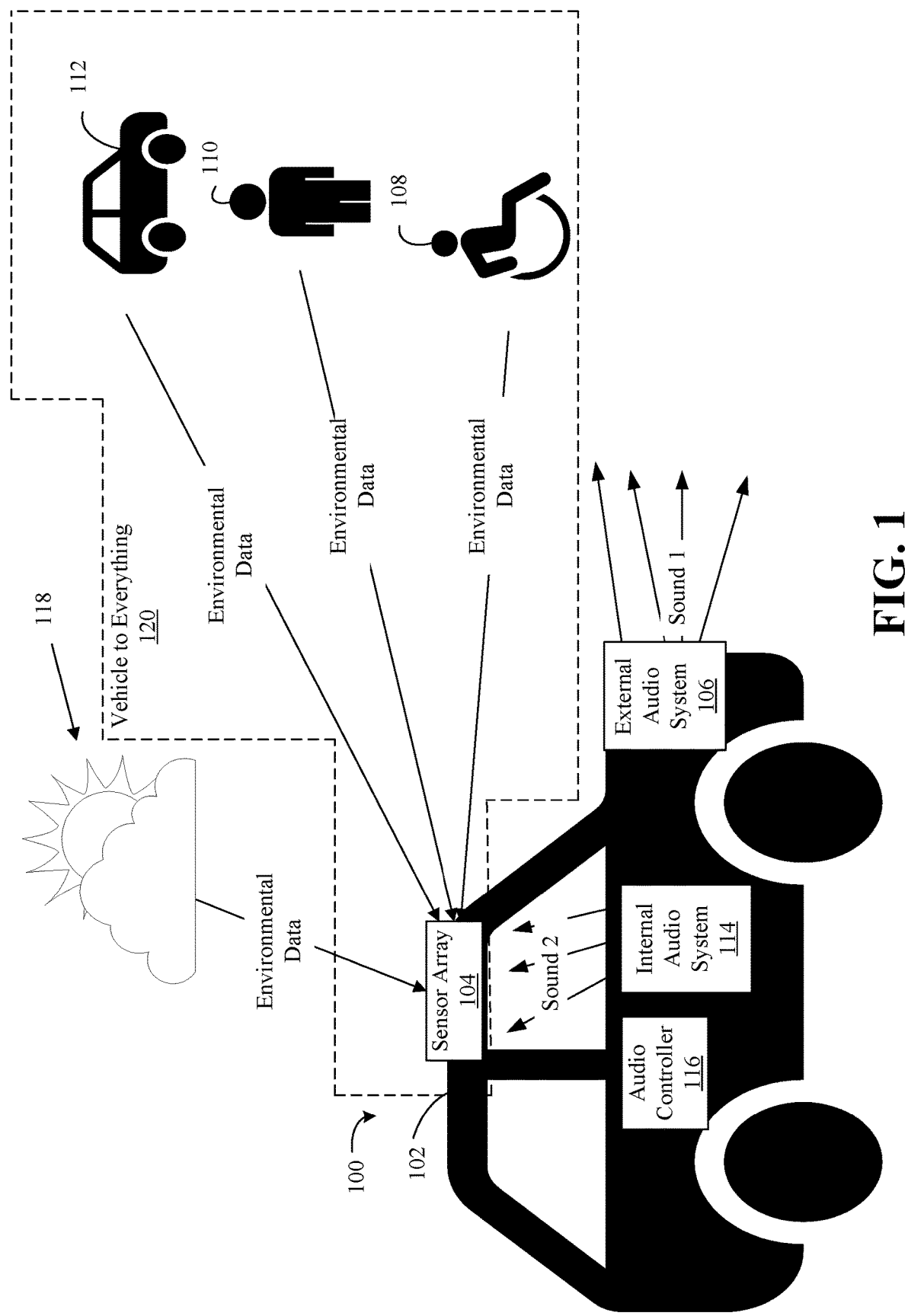
FIG. 1 is a diagram of an example of a sound generation scenario according to an embodiment.

Turning now to FIG. 1, a sound generation scenario 100 is shown. A vehicle (e.g., car, taxi, shuttle, truck, van, sport utility vehicle/SUV, aircraft, etc.) 102 may include a sound generation system that includes a sensor array 104, external audio system 106, internal audio system 114 and audio controller 116. As will be explained in further detail below, the audio controller 116 may receive sensor data from the sensor array 104 to generate sounds 1 and 2 (e.g., emitted sounds) with the internal audio system 114 and/or external audio system 106.

The sensor array 104 may capture environmental data associated with an environment of the vehicle 102. For example, the sensor array 104 may obtain environmental data that may include data of surrounding objects such as mobility impaired individual 108, pedestrian 110 and other vehicle 112. The sensor array 104 may further obtain environmental data associated with weather 118.

In some embodiments, the mobility impaired individual 108, the pedestrian 110 and the other vehicle 112, the sensor array 104 and other elements of the vehicle 102 may be part of a vehicle to everything (V2X) communication network 120. Thus, the vehicle 102 may be made aware of and retrieve information related to the mobility impaired individual 108, the pedestrian 110 and the other vehicle 112 through a high-speed, low latency V2X communication network 120. V2X may encompass vehicle communication such as vehicle-to-vehicle (V2V), vehicle-to-infrastructure (V2I), and vehicle-to-pedestrian (V2P), vehicle-to-network (V2N), vehicle-to-device (V2D) and vehicle-to-grid (V2G) communications, among others. The V2X network may utilize various forms of communication, including but not limited to various wireless standards such as 802.11p, long term evolution (LTE), etc. For example, the mobility impaired individual 108, the pedestrian 110 and the other vehicle 112 may communicate directly with the vehicle 102 through the V2N network. Any of the embodiments described herein may be combined with communication between the vehicle 102 and the mobility impaired individual 108, the pedestrian 110 and the other vehicle 112 through the V2N network.

The audio controller 116 may control sound generated through the external audio system 106 and the internal audio system 114 based on the environmental data and one or more operating conditions associated with the vehicle. Examples of operating conditions may include whether a combustion engine of the vehicle 102 is actuated, if the vehicle 102 is in movement, if the vehicle 102 has no combustion engine, whether power is being supplied from an electric motor or battery, whether an accelerator is triggered to cause acceleration, whether a brake of the vehicle 102 is triggered to cause deceleration, etc.

The types of operating conditions may vary depending on a type of the vehicle 102. For example, if the vehicle 102 is a hybrid, an operating condition may include a check to identify whether the combustion engine is actuated or an electric motor is actuated. If the vehicle 102 is an electric car that lacks a combustion engine no such check on a combustion engine needs to be executed. That is, it may be assumed that no such combustion engine is actuated. If the car has an auto-stop feature (e.g., combustion engine is turned off during idle moments), then an operating condition may include whether the combustion engine is actuated while the vehicle 102 is in operation.

Regardless of the type of the vehicle 102, the audio controller 116 may control the external audio system 106 and the internal audio system 114 to emit sounds 1 and 2 when the vehicle 102 is in operation. In particular, in some embodiments sounds 1 and 2 are emitted when the vehicle 102 is relatively quiet to make the presence of vehicle 102 known, enhance safety and enhance driving perception of a driver of the vehicle 102.

For example, if the vehicle 102 is particularly quiet (e.g., an electric vehicle or hybrid vehicle with the combustion engine not actuated), the pedestrian 110 may be unable to identify that the vehicle 102 is nearby and approaching the pedestrian 110. Thus, the vehicle the audio controller 116 may control the external audio system 106 to emit sound 1 towards pedestrian 110 so that the pedestrian 110 ascertains the presence of vehicle 102. Likewise, sound 1 may be projected towards the other vehicle 112 and the mobility impaired individual 108. Thus, safety may be enhanced by providing an auditory warning to a surrounding area of the vehicle 102.

Further, the audio controller 116 may control the internal audio system 114 to emit sound 2 towards a cabin of the vehicle 102. Doing so may enhance safety and a driving perception. For example, the driver of vehicle 102 may trigger the accelerator to cause the vehicle 102 to rapidly increase in speed. If the vehicle 102 does not emit noise from a combustion engine, the driver may be unaware of how quickly the vehicle 102 is travelling due to the lack of auditory queues from the vehicle 102. Thus, the internal audio system 114 may emit sound 2 to provide an indication to the driver of the speed of the vehicle 102. Doing so may also enhance the driver's perception of the vehicle 102 as being powerful and pleasing.

In some embodiments, the audio controller 116 may further cause the internal audio system 114 to cancel noise (e.g., noise from outside the cabin, engine noise, etc.) so that the driver is undisturbed from external noises such as a combustion engine of the vehicle 102 or a hydrogen pump and air compressor of the vehicle 102 if the vehicle 102 is a fuel-cell vehicle. Sound 2 may therefore be emitted in conjunction (e.g., simultaneously) with such noise cancellation. Doing so may filter unpleasant sounds emitted from vehicle 102 and around vehicle 102 while projecting a pleasant driving sound to the driver to enhance perception.

The audio controller 116 may also identify weather conditions from the weather 118. As already noted, the sensor array 104 may sense the weather 118. One or more of the sensor array 104 or the audio controller 116 may extrapolate the weather conditions from the sensed weather. The audio controller 116 may modify one or more characteristics of the sound 1 and 2 based on the weather conditions.

For example the sensor array 104 may detect a weather condition (e.g. rain and wind) that may lead to an increase in ambient noise above a first predetermined threshold. For example, the sensor array 104 may detect high winds or increased rainfall, and in response the audio controller 116 may modify a characteristic (e.g., a sound level, an intensity, a pitch, amplitude, frequency, wavelength, time period, velocity of the sound wave, etc.) of sounds 1 and 2 to increase the prominence of sounds 1 and 2 relative to the weather conditions. For example, sounds 1 and 2 may increase in volume. In some embodiments and responsive to the detected weather conditions, the audio controller 116 may prompt (e.g., a pop-up request) the driver to select whether one or more sounds 1 and 2 are to be turned off to reduce power consumption or otherwise modified to increase a prominence of sounds 1 and 2 (e.g., raised in volume and or sound level). The audio controller 116 may respond accordingly to the driver's selection to cause the internal audio system 114 and external audio system 106 to cease emission of sounds 1 and 2 or increase the prominence of sounds 1 and 2.

In some embodiments, the sensor array 104 may detect ambient noise and the audio controller 116 may be configured to identify characteristics of the ambient noise. For example, the audio controller 116 may determine that the ambient noise has reached a first predetermined threshold, and therefore a characteristic (e.g., a sound level, an intensity, a pitch, amplitude, frequency, wavelength, time period, velocity of the sound wave, etc.) of sounds 1 and 2 should be enhanced to increase the prominence of sounds 1 and 2 relative to the ambient noise. In some embodiments, when the ambient noise reaches the first predetermined threshold or a second predetermined threshold higher than the first predetermined threshold, the driver may be prompted (e.g., a pop-up request) to select whether one or more sounds 1 and 2 are to be turned off to reduce power consumption or increase a prominence of sounds 1 and 2 (e.g., raised in volume and or sound level). The audio controller 116 may respond accordingly to the driver's selection to cause the internal audio system 114 and external audio system 106 to cease emission of sounds 1 and 2 or increase the prominence of sounds 1 and 2.

In some embodiments, the audio controller 116 may be configured to identify a location characteristic of the detected ambient noise. In some embodiments, the V2V system 120 may allow for detection of the location of the ambient noise. For example, the audio controller 116 may detect ambient noise. The audio controller 116 may then query a surrounding area to identify what objects are surrounding the vehicle 102. In response, the other vehicle 112 may transmit a location of the other vehicle 112 which the audio controller 116 may then utilize as the location characteristic. In some embodiments, data from the V2V system 120 is combined with data extrapolated from the environment data to identify the location characteristic with accuracy. For example, the audio controller 116 may be configured to identify from the environmental data and/or the V2V system 120 that the other vehicle 112 is within a predetermined proximity of the vehicle 102 and emitting sound 3 (not pictured). The audio controller 116 may modify one or more characteristics of sound 1 to distinguish sound 1 from sound 3. In some embodiments, sound 3 of the other vehicle 112 may be identified from the ambient noise, and characteristics (e.g. frequency & amplitude) of sound 3 may be identified. If the characteristics of sound 1 are sufficiently similar to the characteristics of sound 3, the characteristics of sound 1 may be modified to differentiate from the characteristics of sound 3 to distinguish sound 1 from sound 3. Doing so may distinguish vehicle 102 from other vehicle 112. If the characteristics of sound 1 are sufficiently different from the characteristics of sound 3, then no further differentiation may be necessary.

In some embodiments, the audio controller 116 may turn off one or more speakers of the external audio system 106 that are located only on a side of the vehicle 102 that faces directly towards the other vehicle 112, while other speakers of the external audio system 106 continue to emit sound 1 to conserve energy. In some embodiments, the one or more speakers may be turned off in response to an identification that sound 1 cannot be modified to distinguish from sound 3.

In some embodiments, the audio controller 116 may be configured to identify a source characteristic of the detected ambient noise. For example, the audio controller 116 may identify a source of the ambient noise, such as a type of vehicle or object that emits the noise. In some embodiments, the audio controller 116 may receive a communication through the V2X network 120 that identifies the source (e.g., ambulance) of the detected ambient noise, and sets the identified source as the source characteristic. The audio controller 116 may adjust characteristics of sounds 1 and 2 accordingly. For example, sound levels of sounds 1 and 2 may be reduced if the source characteristic indicates that an emergency vehicle emitted at least a portion of the ambient noise. In such embodiments, sound 2 may be reduced to a greater extent than sound 1 so that the driver will be alerted and may act appropriately (e.g., slow down and pull over to side of road).

In some embodiments, audio controller 116 may utilize the source characteristic and another characteristic of the ambient noise, for example intensity. For example, if the source characteristic indicates that an emergency vehicle emitted part of the ambient noise, and the part is increasing in a particular characteristic (e.g., intensity, sound level and/or volume) over time, the audio controller 116 may cause the internal audio system 114 to reduce a characteristic (e.g., intensity, sound level and/or volume) of sound 2. That is, it may be inferred that an increase in the particular characteristic indicates that the emergency vehicle is approaching the vehicle 102 and therefore the driver should be alerted to as much. The characteristic of sound 1 may be reduced in proportion to the increase in the particular characteristic of the part of the ambient noise. In some embodiments, the audio controller 116 may further cause the internal audio system 114 to increase the characteristic of sound 2 in proportion to a decrease in the particular characteristic of the part of the ambient noise (e.g., emergency vehicle drives away from vehicle). Thus, the characteristic of sound 2 may be inversely proportional to the particular characteristic of the part of the ambient noise. The audio controller 116 may cause the external audio system 106 to likewise reduce and increase a characteristic of sound 1 based on the ambient noise.

Vehicle 102 may also detect moving objects through the sensing array 104 and/or the V2X network 120. For example, the sensor array 104 may detect that the pedestrian 110 is moving towards the vehicle 102. In some embodiments, the sensor array 104 may include wave radars and monocular cameras to detect moving objects (e.g., LIDAR sensing, RADAR sensing and Proximity sensing). The audio controller 116 may modify one or more characteristic of sound 1 based on the detection. In some embodiments, the audio controller 116 may cause the external audio system 106 to emit sound 1 or increase a sound level of sound 1 if the distance between the pedestrian 110 and the vehicle 102 is decreasing over time.

In some embodiments, the sound 1 may be modified based on an identified object being categorized into a particular group or category (e.g., a high-risk category). In some embodiments, the audio controller 116 may notified through a communication through the V2X network 120 that an object includes a physical impairment. For example, the audio controller 116 may categorize the mobility impaired individual 108 into a high-risk group due to limited mobility, which may be identified through the sensor array 104 and/or the V2X network 120. The audio controller 116 may modify sound 1 based on the categorization and to emit sound 1 in conjunction with an audio warning and/or at a higher intensity, volume, etc. In some embodiments, audio controller 116 may further identify that the distance between the vehicle 102 and the mobility impaired individual is decreasing, and modify the audio warning based on as much (e.g., car is approaching your position). In some embodiments, the object may include a transmitter that automatically places the object into a high-risk category. For example, the mobility impaired individual 108 may carry a transmitter that automatically sends a beacon to vehicle 102 to categorize the transmitter, and by association the mobility impaired individual 108, into the high-risk category.

The audio controller 116 may further be configured to determine a location of the vehicle 102. For example, sensor array 104 may be part of a global positioning system that identifies a location of the vehicle 102. Based on the location, the audio controller 116 may identify particular areas of interest (e.g., construction sites, crosswalks, school zones, traffic lights, intersections, parking lots, etc.) that are proximate to the location by accessing a map (e.g., an online map or one locally stored). The audio controller 116 may modify one or more characteristics of sound 1 based on the particular areas of interest. For example, if a construction site is determined to be nearby, the sound level of sound 1 may be increased. If the location is in a parking lot, sound 1 may include a verbal warning (e.g., car in movement, please walk carefully). If the location is proximate to a cross-walk and is moving towards a cross-walk, sound 1 may be modified to include a verbal warning (e.g., "car is approaching cross-walk, please be careful"). Thus, sound 1 may be modified to include a verbal indicator of a predicted action of the vehicle 102 and/or whether the vehicle 102 is approaching a particular area of interest.

In some embodiments, the vehicle 102 may receive notification of a particular area of interest proximate the vehicle 102 through the V2X network 120. The audio controller 116 may further be configured to identify particular areas of interest (e.g., construction sites, crosswalks, school zones, traffic lights, intersections, parking lots, etc.) based on image data. The audio controller 116 may modify one or more characteristics of sound 1 based on the particular areas of interest as described above.

In some embodiments, a position of an object relative to the vehicle 102 may be determined and used to control a direction of sound 1 and to project sound 1 towards the object. For example, suppose that the external audio system 106 includes three speakers: a first speaker directed towards a front of the vehicle 102, a second speaker directed towards a left side of the vehicle 102, and a third speaker directed towards a right side of the vehicle 102. If audio controller 116 detects that the pedestrian 110 is on the left side of the vehicle 102, the first sound may only be projected through the second speaker and not the first and third speakers to save power and energy. In some embodiments, each of the first, second and third speakers may project the first sound, but the second speaker may have an increased sound level relative to the first and third speakers due to the position of the pedestrian 110. In some embodiments, the audio controller 116 may cause a speaker out of the external audio system 106 that is closest to the pedestrian 110 to project sound 1 and/or project sound 1 at an increased sound level relative to other speakers of the external audio system 106. Thus, the audio controller may prioritize which speakers activate or are the most powerful based on where an object (e.g., a moving object) is located with respect to the vehicle 102. The position may be determined through communication (e.g., receive location information) over the V2X network 120, and/or data from the sensor array 104.

In some embodiments, the sensor array 104 may be configured to detect a time of day. The audio controller 116 may use the time of day to determine the most robust sensors of the sensor array 104 to utilize. For example, infrared cameras of the sensor array 104 may only be utilized during certain times of the day. In some embodiments, the audio controller 116 may adjust characteristics of the internal audio system 114 and external audio system 106 based on the time of day. For example, the audio controller 116 may cause the external audio system 106 to decrease a sound volume during predetermined hours (e.g., 12 AM to 6 AM) to comply with local sound ordinances and rules.

In some embodiments, the audio controller 116 may be configured to identify when an interrupt (e.g., an incoming call) is received. If an interrupt is received, the audio controller 116 may prompt the driver to select between ceasing emission of sound 2 and responding to the interrupt, or ignoring the interrupt. For example, if an incoming call is detected, the audio controller 116 may ask the driver to select between picking up the call and ceasing emission of sound 2, or ignoring the phone call and continuing emission of sound 2. If the driver selects to pick up the call, the audio controller 116 may cause the internal audio system 114 to cease emission of sound 2. Otherwise, the driver selects ignoring the phone call so the internal audio system 114 may continue to emit sound 2.

As discussed above, in some embodiments, the audio controller 116 may be configured to control the internal and external audio systems 114, 106 according to operating conditions of the vehicle 102. For example, the operating conditions may include whether a combustion engine of the vehicle 102 is actuated, whether an electric motor of the vehicle 102 is activated, whether the vehicle 102 is accelerating or decelerating and so. It is worthwhile to note that the operating conditions may vary depending on a type (e.g., hybrid, electric, auto-start stop, mild, etc.) of the vehicle 102 as will be discussed later. Exemplary Table I (e.g., a data structure stored in hardware or software) is provided below to illustrate engine sound options that simulate engine sounds of engines operating at a specific rotations-per-minute (RPM). The audio controller 116 may access Table I to reference a type of sound that the internal audio system 114 and/or the external audio system 106 are to simulate. Table I is provided below:

TABLE I

| Acceleration | Option 1 Engine Sound | | Option 2 Engine Sound | |
| --- | --- | --- | --- | --- |
| | (RPM) | (Sound) | (RPM) | (Sound) |
| −G1 | X + X1 | S + S1 | Y + Y1 | T + T1 |
| . | . | . | . | . |
| −G2 | X + X2 | S + S2 | Y + Y2 | T + T2 |
| . | . | . | . | . |
| 0 | X | S | Y | T |
| . | . | . | . | . |
| G3 | X + X3 | S + S3 | Y + Y3 | T + T3 |
| . | . | . | . | . |
| G4 | X + X4 | S + S4 | Y + Y4 | T + T4 |

In some embodiments, Table I may include frequencies of sounds rather than RPM.

The sensor array 104 may be any suitable type(s) of sensor(s) that operates as described above. For example, the sensor array 104 may include one or more of microphones, rain sensors, anemometers to detect wind speed & direction, noise sensors, Cameras, Light Detection and Ranging (LIDAR), global positioning system (GPS), radars, monocular cameras and so forth. Thus, some embodiments may enhance safety, driveability and perception while also efficiently reducing power consumption.

Figure 2:
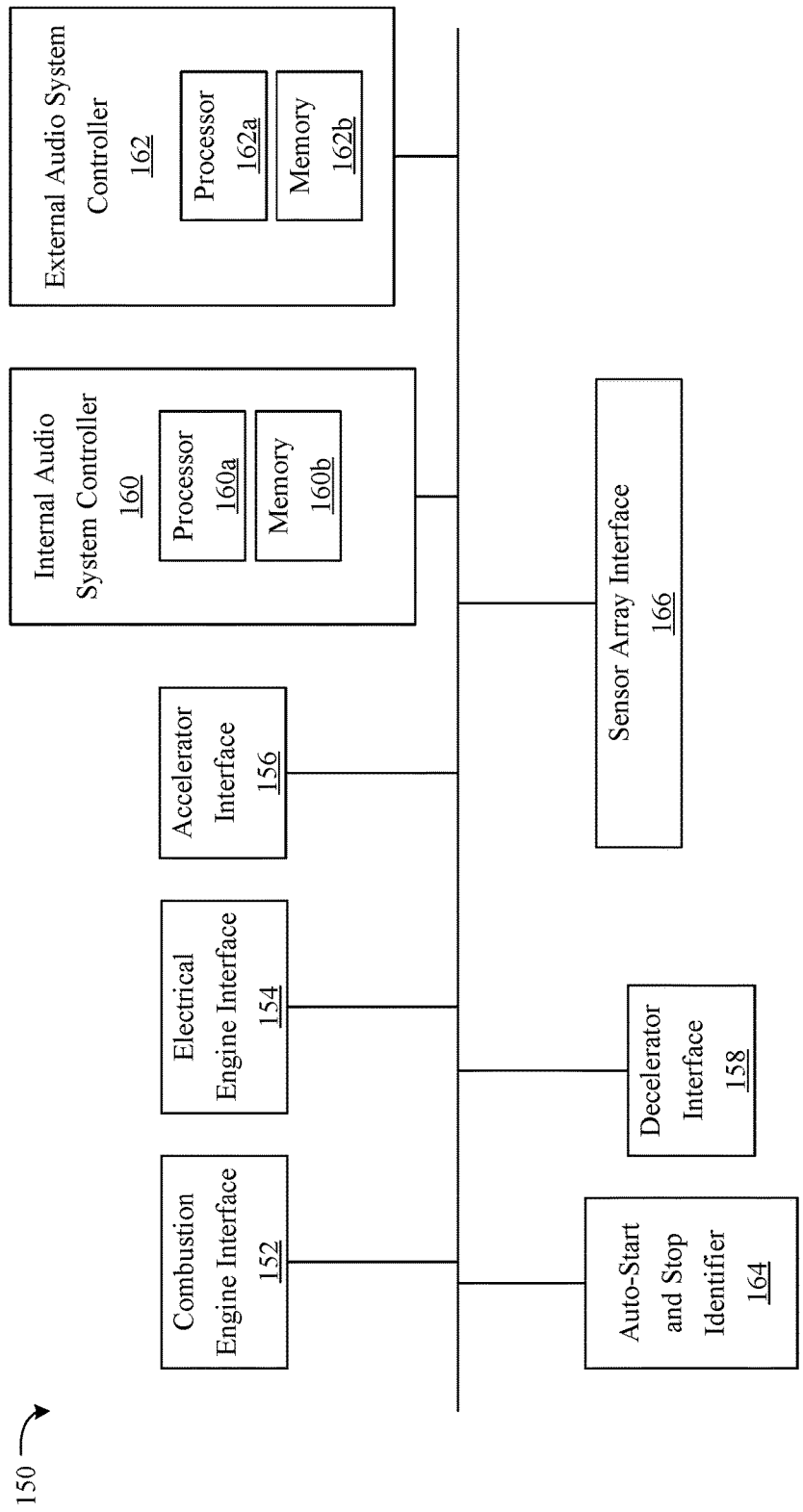
FIG. 2 is a block diagram of an example of an audio control system according to an embodiment.

FIG. 2 shows a more detailed example of a control system 150 to control sound. The illustrated control system 150 may be readily substituted for the audio controller 116 (FIG. 1), already discussed.

In the illustrated example, the control system 150 may include a combustion engine interface 152 to determine whether a combustion engine is actuated. The control system 150 may include an electrical engine interface 154 to determine whether an electrical engine is actuated, and an accelerator interface 156 to determine whether an accelerator is triggered. The control system 150 may include a decelerator interface 158 to determine whether a decelerator is triggered. The control system 150 may include an auto-start and stop identifier 164 to determine if an auto-start stop controller configuration has shut down a combustion engine. The control system 150 may include a sensor array interface 166 that interfaces with a plurality of sensors, for example a global positioning system sensor, proximity sensor, image sensor, audio sensor etc. to obtain sensor data. The sensor array interface 166 may interface with any type of sensor suitable for operations as described herein.

The control system 150 may include an internal audio system controller 160 to control internal speakers of the vehicle and an external audio system controller 162 to control external speakers of the vehicle. The internal audio system controller 160 and the external audio system controller 162 may control the internal and external speakers based on data from the combustion engine interface 152, the electrical engine interface 154, the accelerator interface 156, the decelerator interface 158, the auto-start and stop identifier 164 and the sensor array interface 166.

Additionally, the internal audio system controller 160 may include a processor 160a (e.g., embedded controller, central processing unit/CPU) and a memory 160b (e.g., non-volatile memory/NVM and/or volatile memory) containing a set of instructions, which when executed by the processor 160a, cause the internal audio system controller 160 to control the internal speakers as described herein. Additionally, the external audio system controller 160 may include a processor 162a (e.g., embedded controller, central processing unit/CPU) and a memory 162b (e.g., non-volatile memory/NVM and/or volatile memory) containing a set of instructions, which when executed by the processor 162a, cause the external audio system controller 162 to control the external speakers as described herein.

Figure 3:
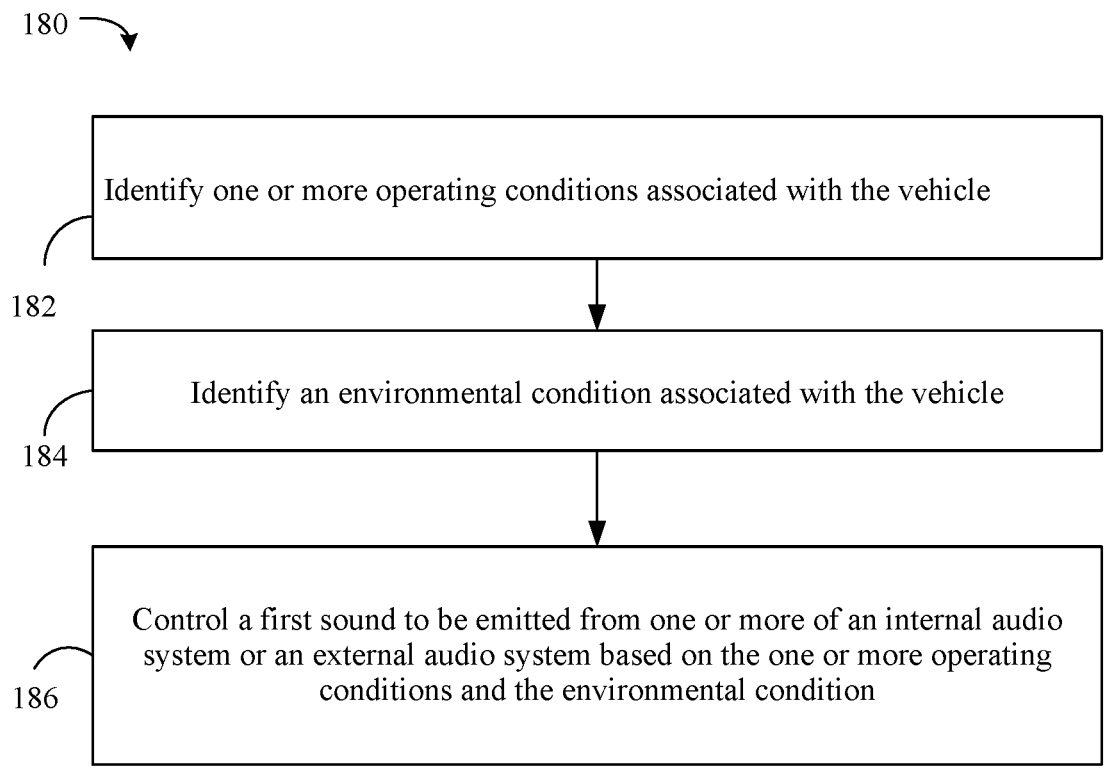
FIG. 3 is a flowchart of an example of a method of simulating engine sounds according to an embodiment.

FIG. 3 shows a method 180 of simulating engine sounds. The method 180 may generally be implemented in a vehicle's audio control system such as, for example, the audio controller 116 (FIG. 1) and/or the control system 150 (FIG. 2). In an embodiment, the method 180 is implemented in logic instructions (e.g., software), configurable logic, fixed-functionality hardware logic, etc., or any combination thereof.

Illustrated processing block 182 identifies one or more operating conditions associated with the vehicle. Illustrated processing block 184 identifies an environmental condition associated with the vehicle. Illustrated processing block 186 controls a first sound to be emitted from one or more of an internal audio system or an external audio system based on the one or more operating conditions and the environmental condition. The internal audio system is to project sounds to a cabin of the vehicle, and the external audio system is to project sounds away from the vehicle.

Figure 4:
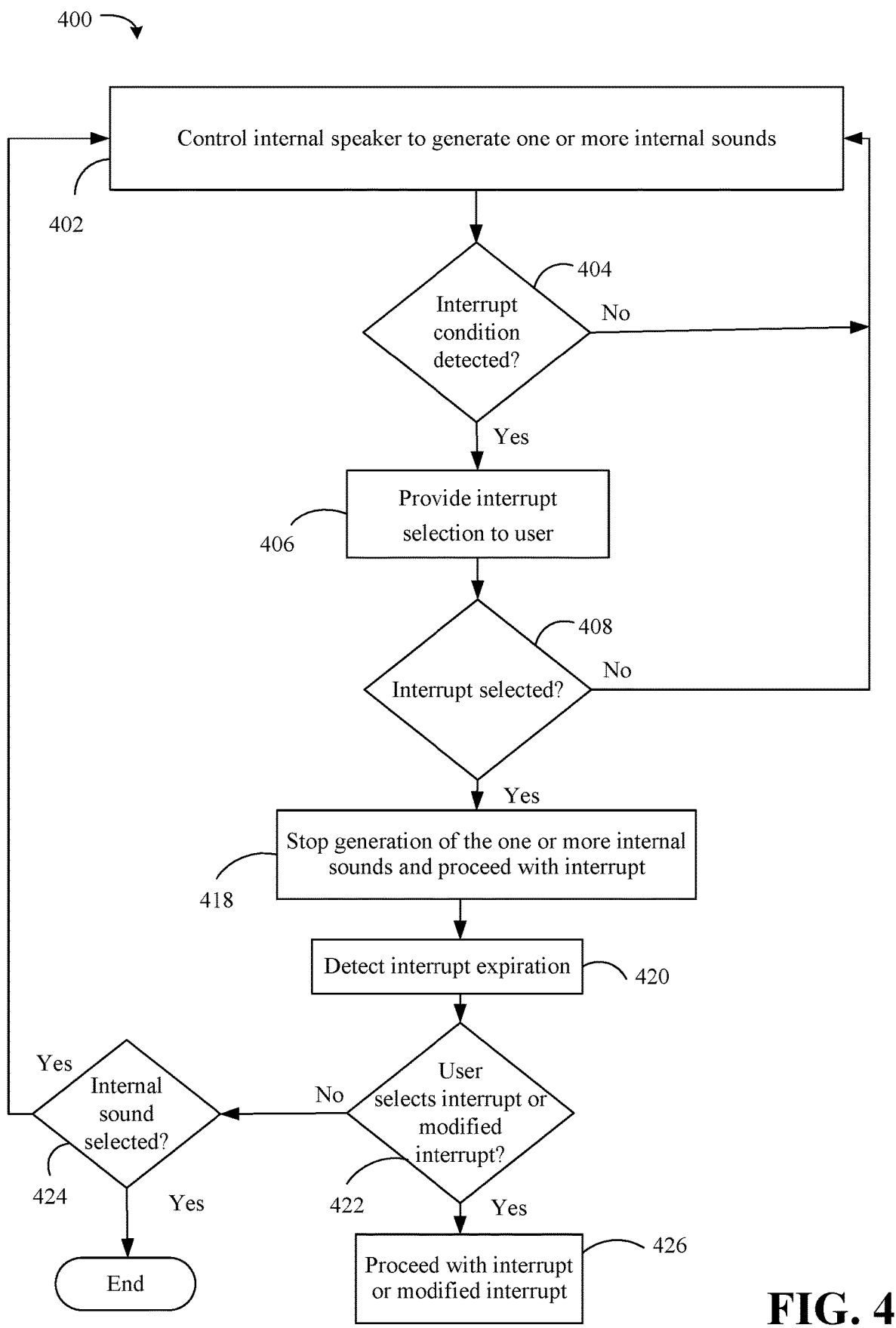
FIG. 4 is a flowchart of an example of a method of interrupting sound emission and generation according to an embodiment.

FIG. 4 shows a method 400 of interrupting sound emission and generation. The method 400 may generally be implemented in an audio control system such as, for example, the audio controller 116 (FIG. 1) and/or the control system 150 (FIG. 2). In an embodiment, the method 400 is implemented in logic instructions (e.g., software), configurable logic, fixed-functionality hardware logic, etc., or any combination thereof.

Illustrated processing block 402 controls internal speakers to generate one or more internal sounds inside of a cabin of a vehicle. Illustrated processing block 404 determines whether an interrupt condition is detected. An interrupt condition may be a condition which may potentially cause an interrupt in the generation of the internal sounds. For example, if the condition may cause the internal speakers to be utilized for another task different from the internal sound generation, the condition may correspond to an interrupt. Some examples of interrupts are incoming phone calls that cause the internal speakers to provide audio feedback of the call (e.g., a person speaking), a selection to play music with the internal speakers, etc. If no interrupt is detected, processing block 402 may continue to execute. Otherwise, processing block 406 may provide an interrupt selection to the user (e.g., a driver of the vehicle). The user may choose to select the interrupt or decline the interrupt. If the user selects the interrupt, illustrated processing block 418 may stop generation of the one or more internal sounds and proceed with the interrupt. For example, processing block 418 may cause the internal speakers to cease generating the one or more internal sounds and proceed or switch to the interrupt. That is, the internal speakers may provide audio associated with the interrupt. For example, if the interrupt is a music selection, the internal speakers may generate the music instead of the one or more internal sounds.

Illustrated processing block 420 detects expiration of the interrupt. For example, if the interrupt was a music song, processing block 420 detects that the music song is completed. Illustrated processing block 422 determines whether the user selects the interrupt or a modified version of the interrupt. For example, if the interrupt was a music song, block 422 may determine whether the user selects to replay the music song (e.g., the original interrupt) or another song (e.g., the modified interrupt). Thus, processing block 422 may identify a category of the interrupt, and determine whether the user desires to continue sound generation from that category. If so, processing block 426 proceeds with the interrupt or the modified interrupt to generate sounds in accordance with the interrupt or modified interrupt. Otherwise, processing block 424 may determine whether the user selects the internal sound. If so, processing block 402 executes. Otherwise, the method 400 ends. In some embodiments, processing block 424 may be omitted and if processing block 422 determines that the user does not select the interrupt or the modified interrupt, then the internal sounds are to be automatically generated.

Figure 5:
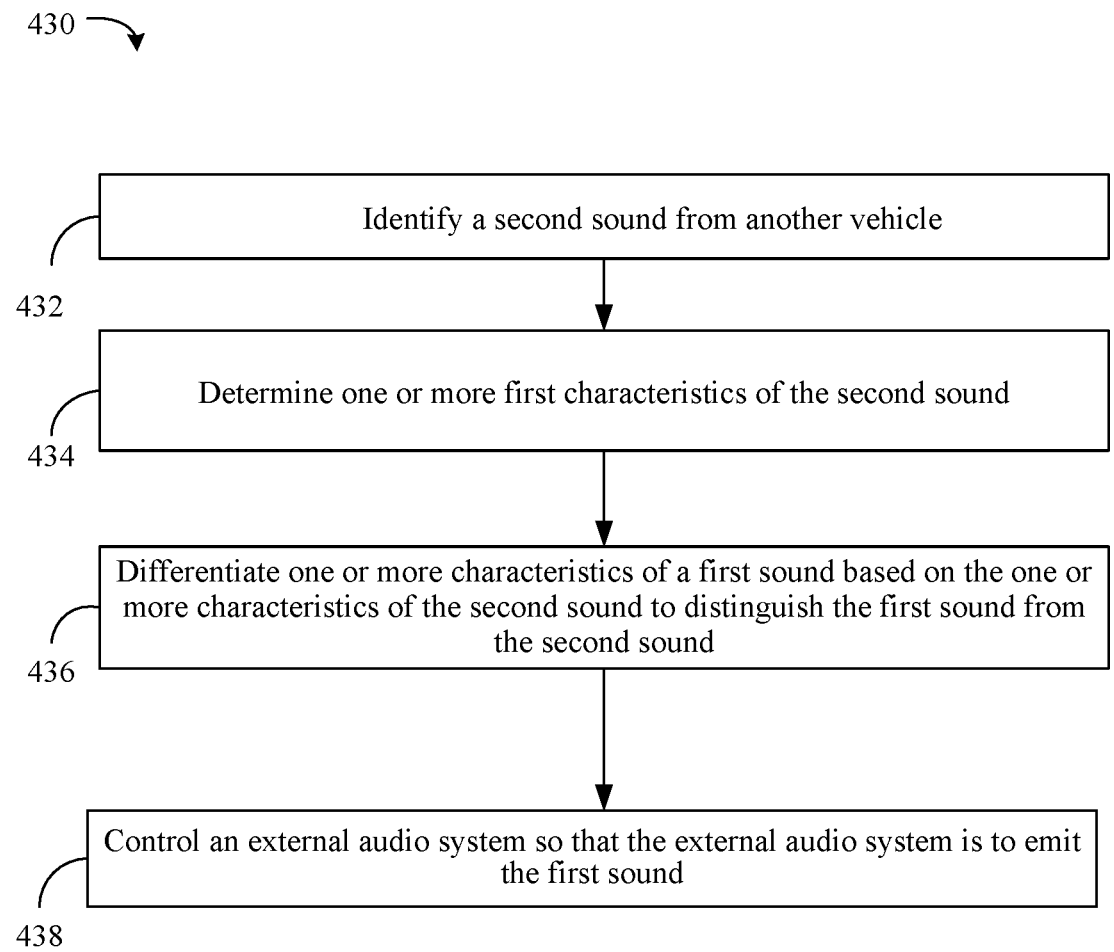
FIG. 5 is a flowchart of an example of a method of sound modification based on sound from other vehicles according to an embodiment.

FIG. 5 shows a method 430 of sound modification based on sound from other vehicles. The method 430 may generally be implemented in a first vehicle's audio control system such as, for example, the audio controller 116 (FIG. 1) and/or the control system 150 (FIG. 2). In an embodiment, the method 430 is implemented in logic instructions (e.g., software), configurable logic, fixed-functionality hardware logic, etc., or any combination thereof. The audio control system may be a part of a first vehicle and controls emission of a first sound.

Figure 6:
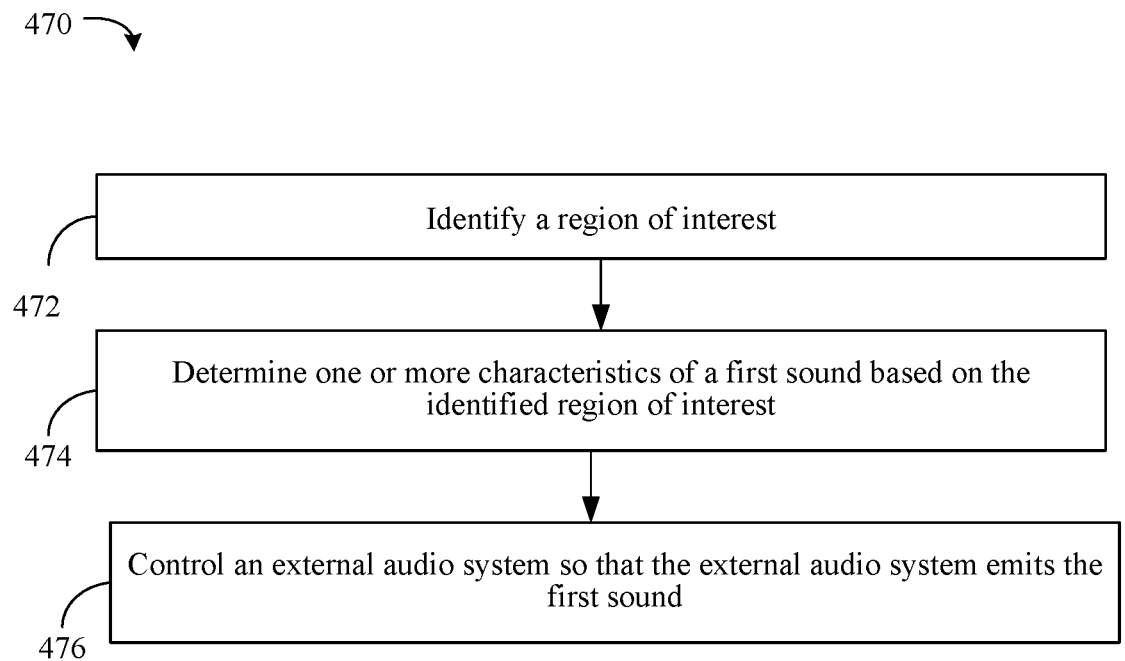
FIG. 6 is a flowchart of an example of a method of adjusting sound emission based on regions of interest according to an embodiment.

Illustrated processing block 432 identifies a second sound from another vehicle. Illustrated processing block 434 determines one or more characteristics of the second sound. Illustrated processing block 436 differentiates one or more characteristics of the first sound based on the one or more characteristics of the second sound to distinguish the first sound from the second sound. Illustrated processing block 438 controls an external audio system of the vehicle so that the external audio system is to emit the first sound FIG. 6 shows a method 470 of image recognition. The method 470 may generally be implemented in a vehicle's audio control system such as, for example, the audio controller 116 (FIG. 1) and/or the control system 150 (FIG. 2). In an embodiment, the method 470 is implemented in logic instructions (e.g., software), configurable logic, fixed-functionality hardware logic, etc., or any combination thereof.

The audio control system may be a part of a first vehicle and controls emission of a first sound.

Illustrated processing block 472 identifies a region of interest. For example, the region of interest may be identified from an image or based on GPS. Illustrated processing block 474 determines one or more characteristics of a first sound based on the identified region of interest. Illustrated processing block 476 controls an external audio system so that the external audio system emits the first sound.

Figure 7:
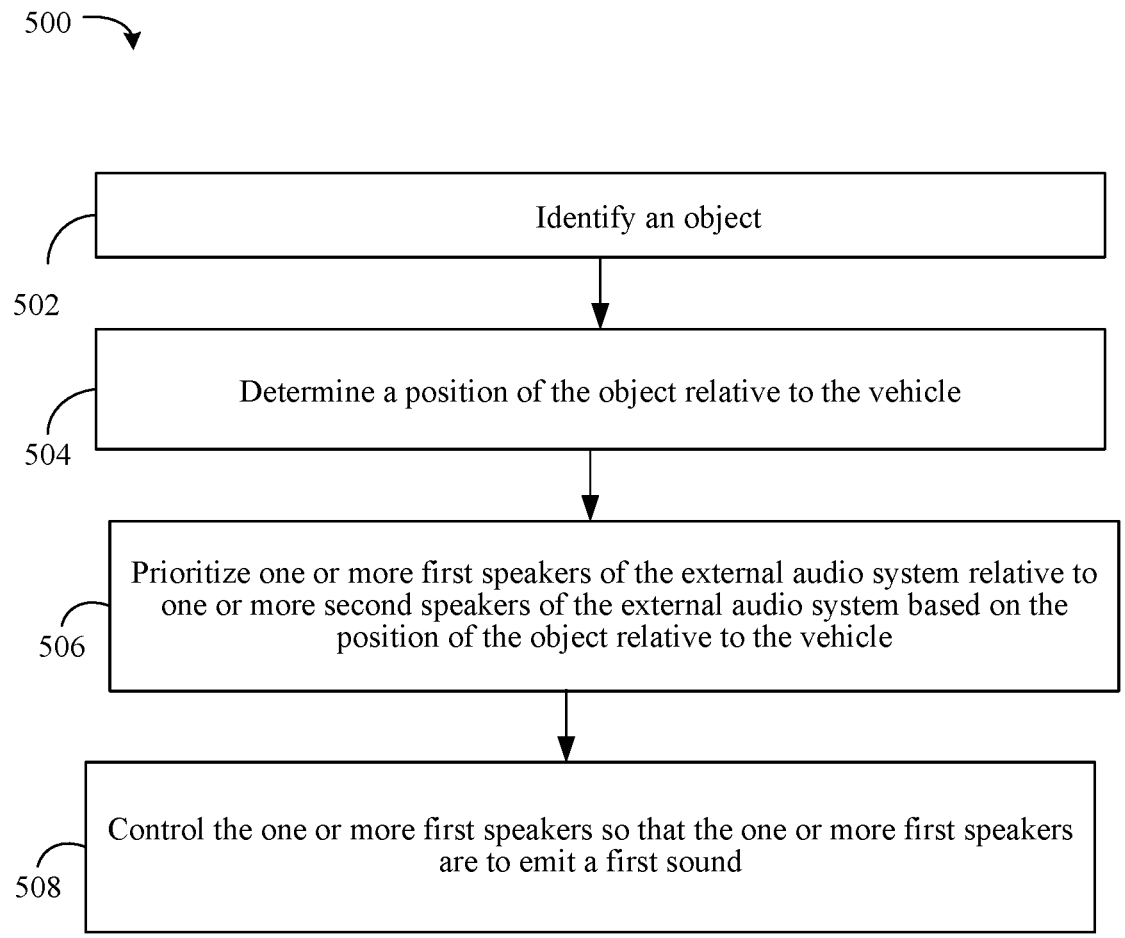
FIG. 7 is a flowchart of an example of a method of speaker prioritization according to an embodiment.

FIG. 7 shows a method 500 of speaker prioritization. The method 500 may generally be implemented in a vehicle's audio control system such as, for example, the audio controller 116 (FIG. 1) and/or the control system 150 (FIG. 2). In an embodiment, the method 500 is implemented in logic instructions (e.g., software), configurable logic, fixed-functionality hardware logic, etc., or any combination thereof.

Illustrated processing block 502 identifies an object. Illustrated processing block 504 determines a position of the object relative to the vehicle. Illustrated processing block 506 prioritizes one or more first speakers of the external audio system relative to one or more second speakers of the external audio system based on the position of the object relative to the vehicle. For example, speakers that are directed towards the position of the object may be prioritized (e.g., allocated more power or emit sound at greater sound levels) over other speakers of the external audio system that are directed away or not directly towards the position. Illustrated processing block 508 controls the one or more first speakers so that the one or more first speakers are to emit a first sound.

Figure 8:
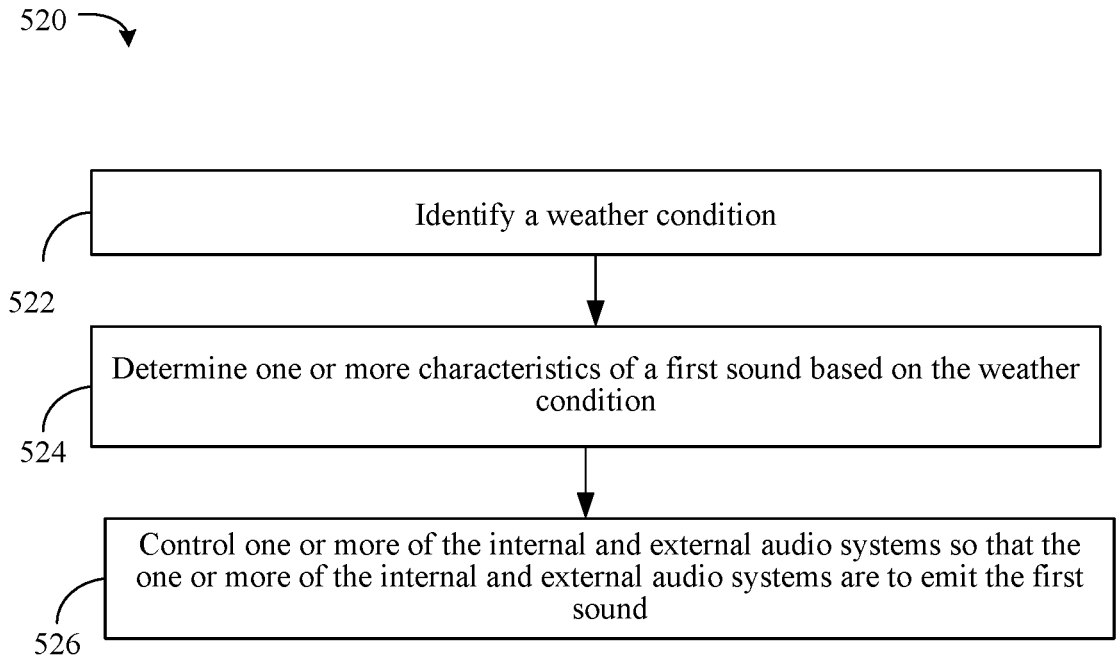
FIG. 8 is a flowchart of an example of a method of modifying sound emission based on weather according to an embodiment.

FIG. 8 shows a method 520 of modifying sound emission based on weather. The method 520 may generally be implemented in a vehicle's audio control system such as, for example, the audio controller 116 (FIG. 1) and/or the control system 150 (FIG. 2). In an embodiment, the method 520 is implemented in logic instructions (e.g., software), configurable logic, fixed-functionality hardware logic, etc., or any combination thereof.

Illustrated processing block 522 identifies a weather condition. Illustrated processing block 524 determines one or more characteristics of a first sound based on the weather condition. For example, if the weather condition is associated with a particularly noisy event (e.g., high winds, high rain, hail, etc.) processing block 524 may increase a sound level, increase an intensity, lower a pitch, etc. of the first sound. If the weather condition is associated with a particularly quiet event (e.g., limited wind, no rain or hail, etc.) processing block 524 may decrease a sound level, decrease an intensity, raise a pitch, modify a wavelength, modify a time period, modify a velocity of the sound wave, etc. of the first sound. Illustrated processing block 526 controls one or more of the internal and external audio systems so that the one or more of the internal and external audio systems are to emit the first sound with the characteristic determined by block processing block 524.

Figure 9:
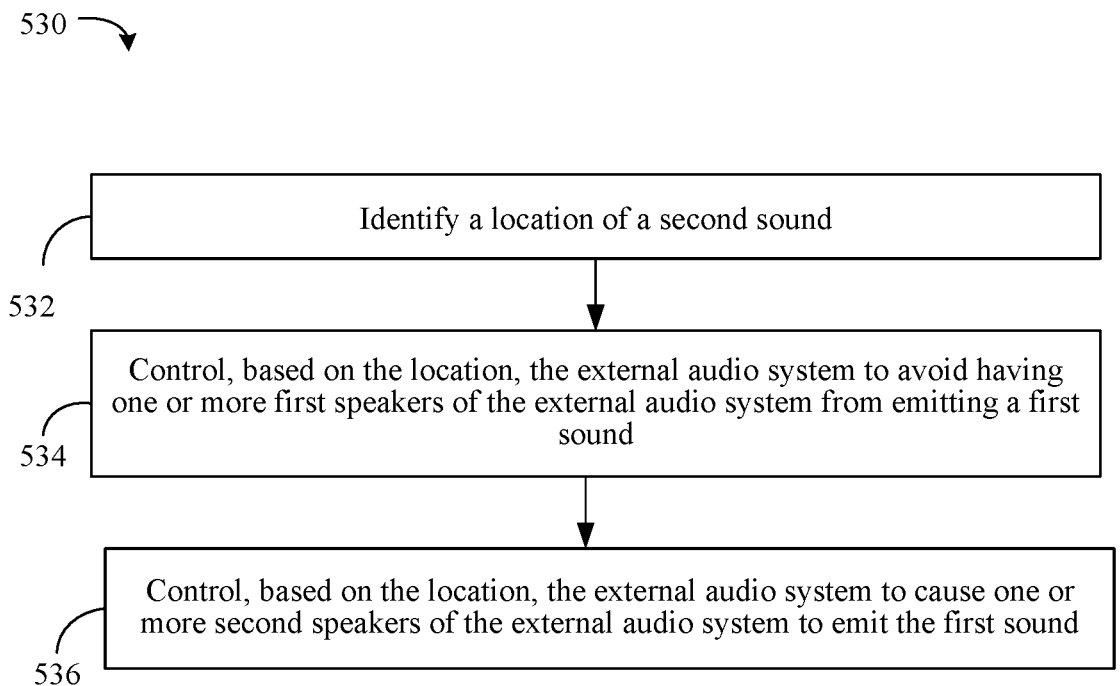
FIG. 9 is a flowchart of an example of a method of modifying sound emission based on a location of another sound according to an embodiment.

FIG. 9 shows a method 530 of modifying sound emission of a first sound based on a location of a second sound. The method 530 may generally be implemented in a vehicle's audio control system such as, for example, the audio controller 116 (FIG. 1) and/or the control system 150 (FIG. 2). In an embodiment, the method 530 is implemented in logic instructions (e.g., software), configurable logic, fixed-functionality hardware logic, etc., or any combination thereof.

Illustrated processing block 532 identifies a location of the second sound. Illustrated processing block 534 controls, based on the location, an external audio system to avoid having one or more first speakers of the external audio system from emitting a first sound. For example, speakers which are directed towards the location of the sound may not emit the emitted sound. Processing block 536 may control, based on the location, the external audio system to cause one or more second speakers (e.g., speakers pointed away from the location of the sound) of the external audio system to emit the first sound. Doing so may reduce power consumption by turning off speakers that may not be heard over the second sound. In some embodiments, method 530 may further execute a check to determine whether the second sound is at a sound level that meets a predetermined threshold. If so, processing block 534 may execute. Otherwise, all speakers may emit the first sound.

Figure 10:
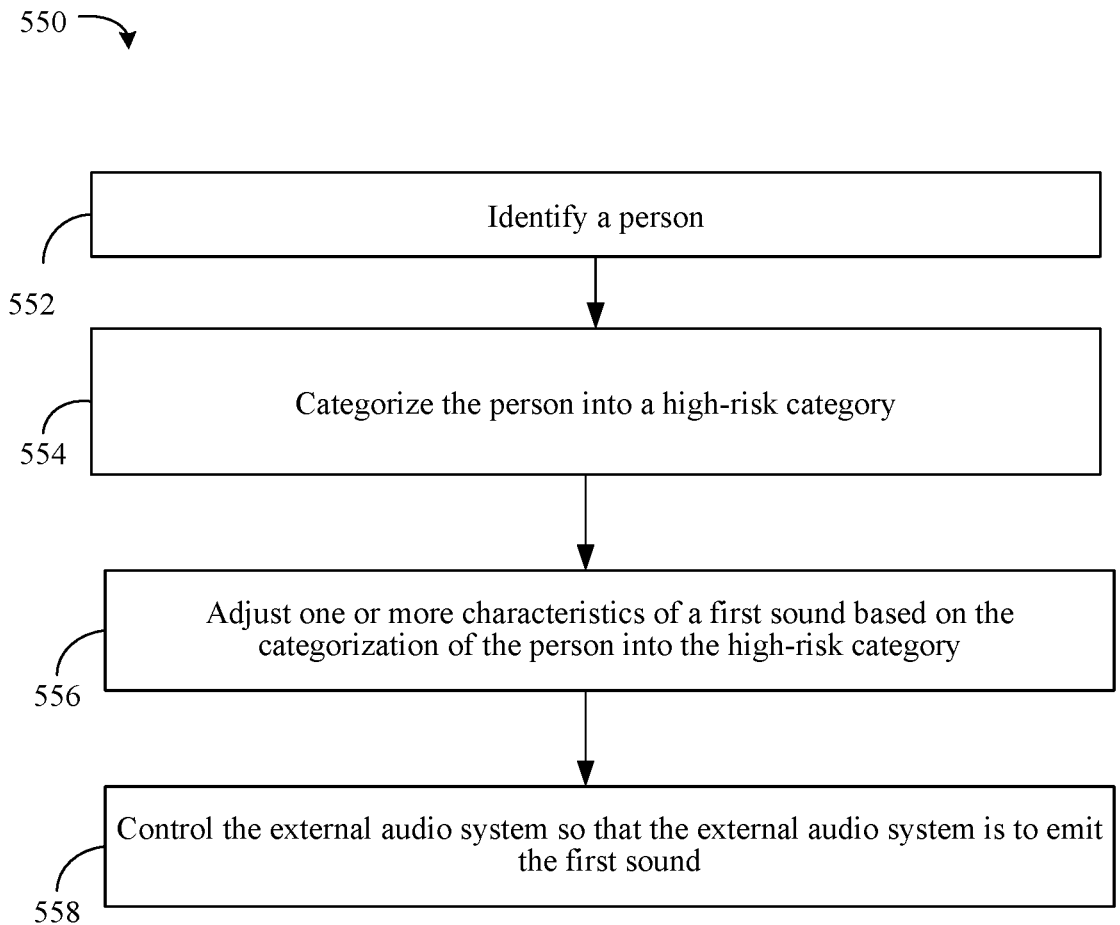
FIG. 10 is a flowchart of an example of a method of modifying sound emission based on categorizing surrounding people according to an embodiment.

FIG. 10 shows a method 550 of modifying sound emission based on categorizing surrounding people. The method 550 may generally be implemented in a vehicle's audio control system such as, for example, the audio controller 116 (FIG. 1) and/or the control system 150 (FIG. 2). In an embodiment, the method 550 is implemented in logic instructions (e.g., software), configurable logic, fixed-functionality hardware logic, etc., or any combination thereof.

Illustrated processing block 552 identifies a person. In some embodiments, the person may be within a predetermined radius of the vehicle. Illustrated processing block 554 categorizes the person into a high-risk category. For example, visual recognition may be used to identify if the person has an impairment (e.g., mobility impaired, visually impaired, mentally impaired, inebriated, etc.) and/or is utilizing a particular mode of high-risk transportation (e.g., bicycle, scooter or motorcycle, etc.) and categorize the person into the high-risk category if so. In some embodiments, processing block 554 may categorize a person based on an identification that the person has a physically challenged device (e.g., hearing aid, walking cane, mobility cane, wheel chair). For example, processing block 554 may identify a person and a physically challenged device from an image, and associate the device with the person to categorize the person. In some embodiments, illustrated processing block 554 detects that the person has a transmitter and automatically categorizes the person into the high-risk category based on the detection of the transmitter. Illustrated processing block 556 adjusts one or more characteristics of a first sound based on the categorization of the person into the high-risk category. For example, the first sound may be adjusted to include a verbal warning or increase a sound level of the first sound. Regardless of the modification, illustrated processing block 556 increases the prominence of the first sound to alert the person of the vehicle's presence. Illustrated processing block 558 controls an external audio system of the vehicle so that the external audio system emits the first sound.

Figure 11:
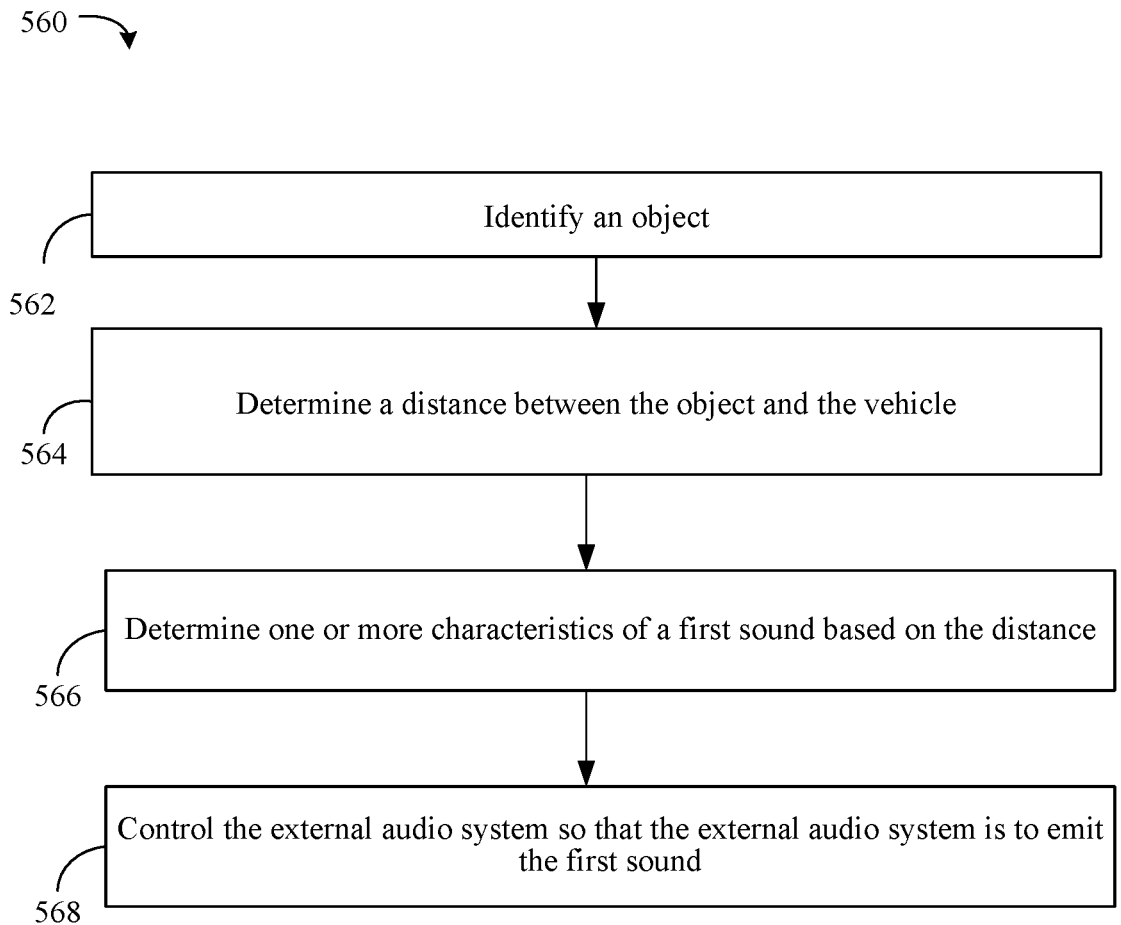
FIG. 11 is a flowchart of an example of a method of modifying sound emission based on a distance between a vehicle and an object according to an embodiment.

FIG. 11 shows a method 560 of modifying sound emission based on a distance between a vehicle and an object. The method 560 may generally be implemented in a vehicle's audio control system such as, for example, the audio controller 116 (FIG. 1) and/or the control system 150 (FIG. 2). In an embodiment, the method 560 is implemented in logic instructions (e.g., software), configurable logic, fixed-functionality hardware logic, etc., or any combination thereof.

Illustrated processing block 562 identifies an object. In some embodiments, the object may be within a predetermined radius of the vehicle. Illustrated processing block 564 determines a distance between the object and the vehicle. For example, visual recognition may be used to identify the object. Illustrated processing block 566 determines one or more characteristics of a first sound based on the distance. For example, the first sound may be adjusted in proportion to the distance to increase in prominence as the distance decreases. Illustrated processing block 568 controls an external audio system of the vehicle so that the external audio system emits the first sound.

Figure 12:
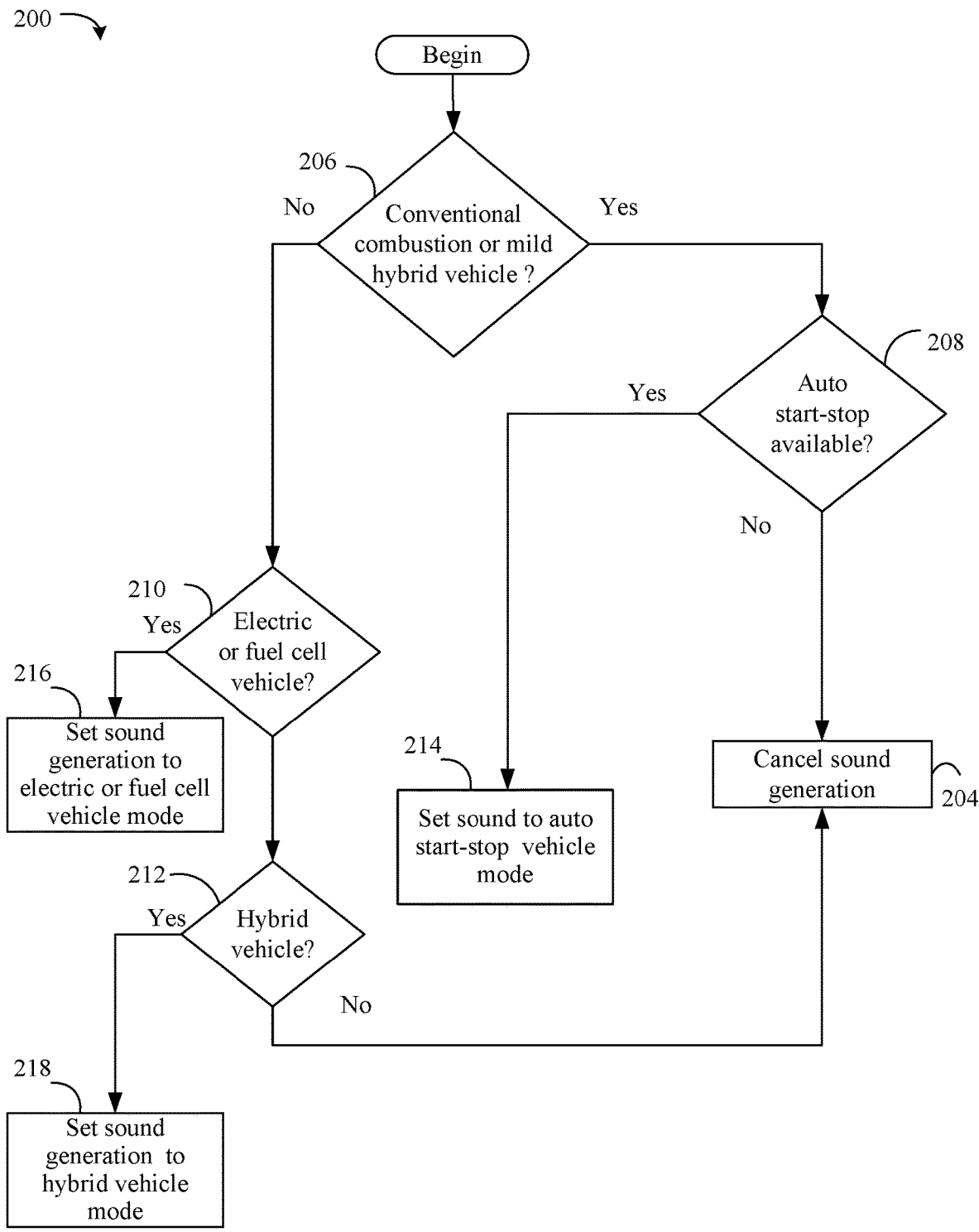
FIG. 12 is a flowchart of an example of a method of controlling sound emission based on a vehicle type according to an embodiment.

FIG. 12 shows a method 200 of controlling sound emission based on a vehicle type. The method 200 may generally be implemented in a vehicle's audio control system such as, for example, the audio controller 116 (FIG. 1) and/or the control system 150 (FIG. 2). In an embodiment, the method 200 is implemented in logic instructions (e.g., software), configurable logic, fixed-functionality hardware logic, etc., or any combination thereof.

Processing block 206 may determine whether the vehicle is a conventional combustion or mild hybrid vehicle. If so, processing block 208 may determine whether an auto start-stop feature of the vehicle is available. If not processing block 204 may cancel sound generation. If such features are enabled, illustrated processing block 214 may set a sound generation mode to an auto start-stop vehicle mode.

If at illustrated processing block 206, the vehicle is determined not to be a conventional combustion vehicle, illustrated processing block 210 may determine whether the vehicle is an electric or fuel cell vehicle. For example, the vehicle type may be set ahead of time to indicate that the vehicle is an electric or fuel cell vehicle. In some embodiments, illustrated processing block 210 may sense parameters of the vehicle to identify whether it is an electric of fuel cell vehicle. If so, processing block 216 may set the sound generation to an electric or fuel cell vehicle mode. If processing block 210 determines that the vehicle is not an electric or fuel cell vehicle, processing block 212 determines if the vehicle is a hybrid vehicle, similar to as described above with respect to processing block 210. If so, processing block 218 sets the sound generation to a hybrid vehicle mode. Otherwise, processing block 204 cancels the sound generation.

Figure 13A:
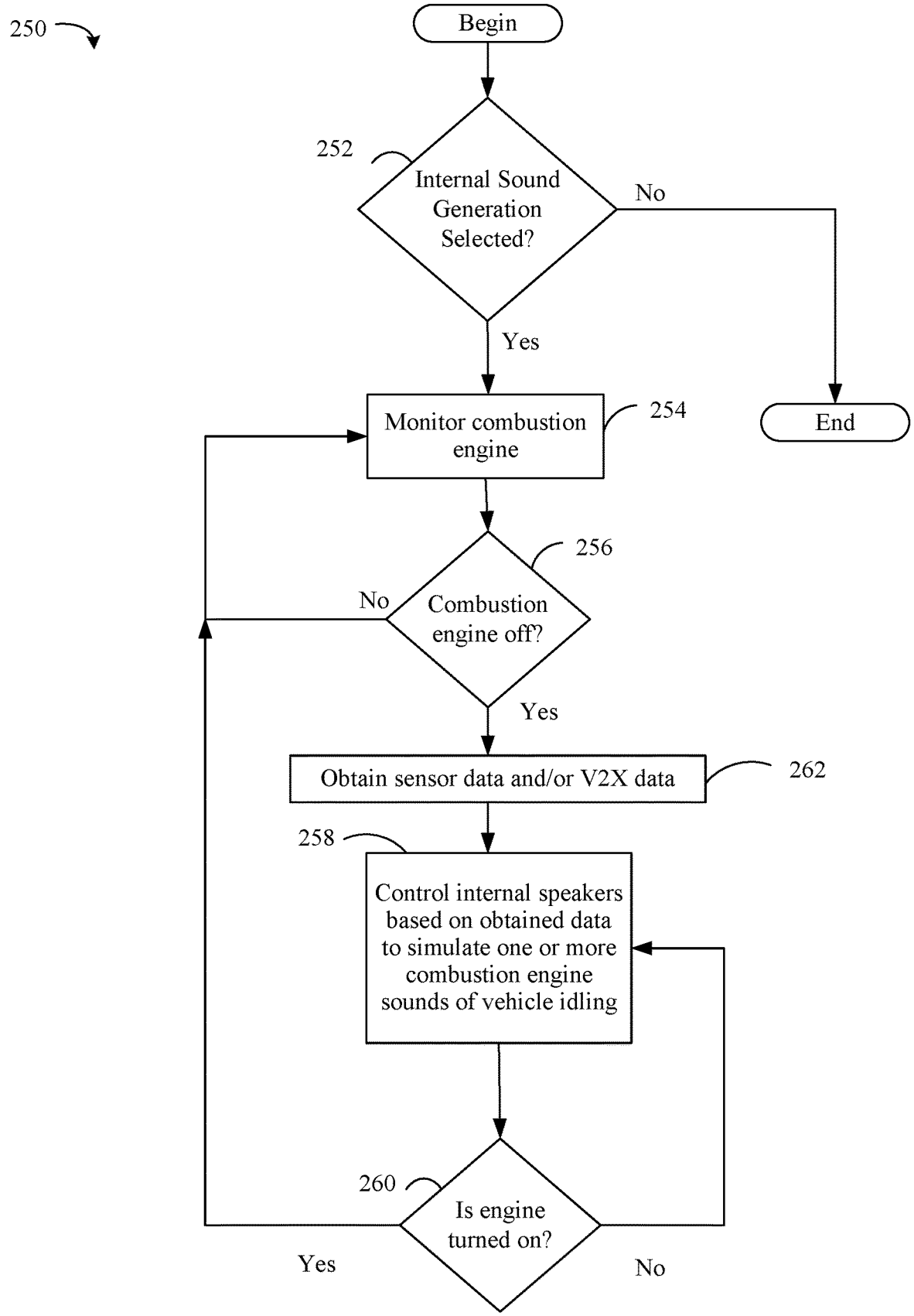
FIG. 13A is a flowchart of an example of a method of controlling internal sound emission when a sound generation mode is set to an auto start-stop mode according to an embodiment.

FIG. 13A shows a method 250 of controlling internal sound emission when a sound generation mode is set to an auto start-stop mode. The method 250 may generally be implemented in a vehicle's audio control system such as, for example, the audio controller 116 (FIG. 1) and/or the control system 150 (FIG. 2), and may be readily substituted for block 214 of FIG. 10 and/or operate in conjunction with method 250. In an embodiment, the method 250 is implemented in logic instructions (e.g., software), configurable logic, fixed-functionality hardware logic, etc., or any combination thereof.

Illustrated processing block 252 determines whether an internal sound generation option is selected. For example, in some embodiments a driver of the vehicle may select to not have internal sound generation. If internal sound generation is not selected, the method 252 may end. If the driver selects the execution of the internal sound generation, illustrated processing block 254 may monitor a combustion engine. That is, an auto-start stop vehicle may deactivate (e.g., turn off) the combustion engine at times when power is not needed, such as when a vehicle is stopped, coasting, braking, etc. Processing block 256 may determine whether the combustion engine is off under such circumstances. If not, the method 250 may continue to monitor the combustion engine at processing block 254. If the combustion engine is off, processing block 262 executes. Processing block 262 obtains sensor data and/or V2X as described herein. Processing block 258 controls internal speakers based on the obtained data to simulate one or more combustion engine sounds of vehicle idling. Processing block 260 determines whether the engine is turned on. If the engine is turned on, processing block 254 executes. Otherwise, processing block 258 continues to execute.

In some embodiments, method 250 may also include selection of different types of sounds. For example, a menu may be presented to the user to present a plurality of sound choices to the user. The driver may select a sound from the menu to be emitted.

Figure 13B:
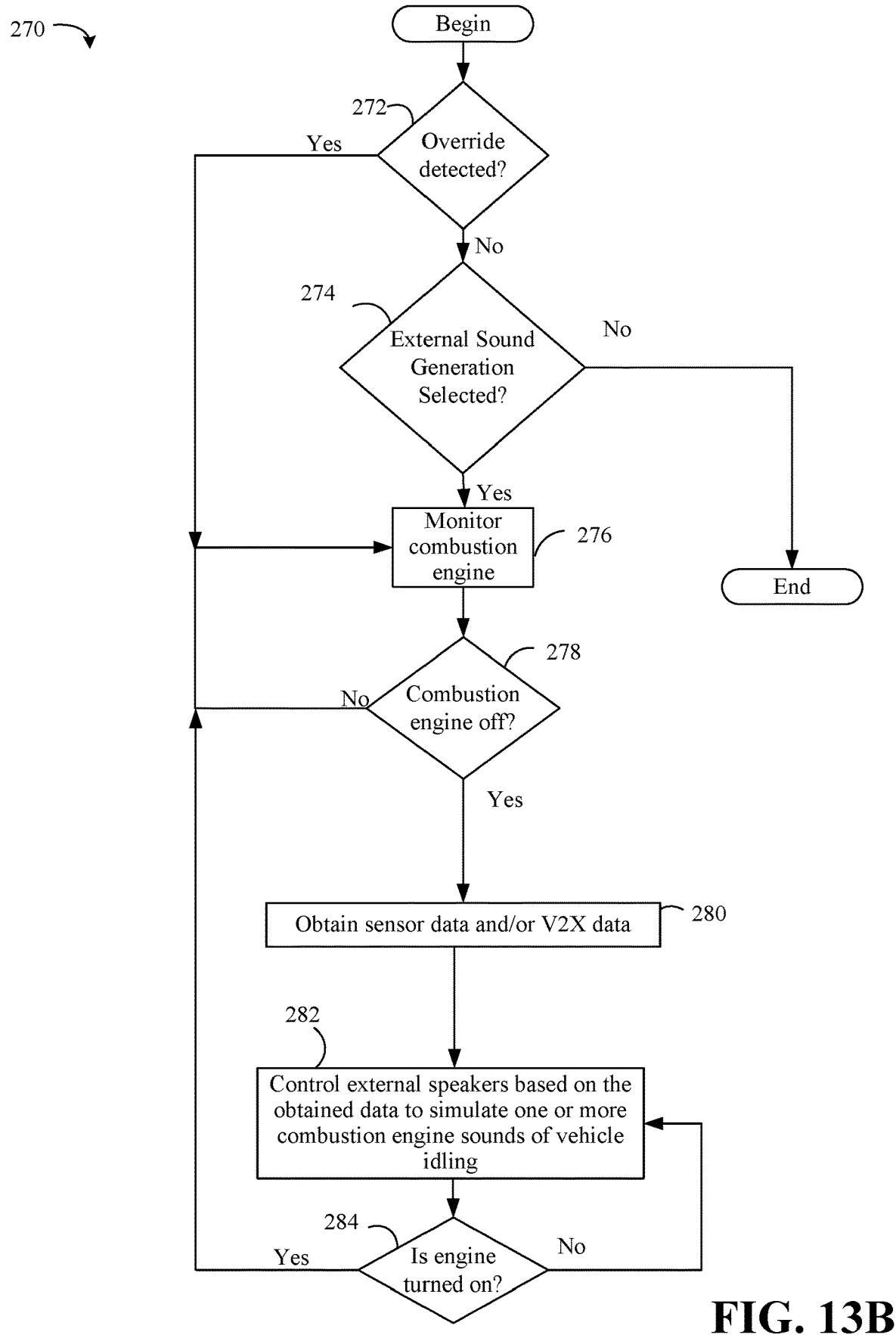
FIG. 13B is a flowchart of an example of a method of controlling external sound emission when a sound generation mode is set to an auto start-stop mode according to an embodiment.

FIG. 13B shows a method 270 of controlling external sound emission when a sound generation mode is set to an auto start-stop mode. The method 270 may generally be implemented in a vehicle's audio control system such as, for example, the audio controller 116 (FIG. 1) and/or the control system 150 (FIG. 2), and may be readily substituted for block 214 of FIG. 10 and/or operate in conjunction with method 250. In an embodiment, the method 270 is implemented in logic instructions (e.g., software), configurable logic, fixed-functionality hardware logic, etc., or any combination thereof.

Illustrated processing block 272 detects whether an override is present. An override may mean that external sound generation cannot be overridden due to safety concerns or to comply with laws. The override may be set remotely by a third party in some embodiments (e.g., remotely to the vehicle). If the override is detected, the method 270 proceeds to illustrated processing block 276. Otherwise, processing block 274 executes. It will be understood that the override feature may be implemented in any of the embodiments described herein.

Illustrated processing block 274 determines whether an external sound generation option is selected. For example, in some embodiments a driver of the vehicle may select to not have external sound generation. If so, the method 270 may end. If the driver selects the execution of the external sound generation, illustrated processing block 276 may monitor a combustion engine. As described above, the combustion engine may turn off during times when power is not needed. Processing block 278 may determine whether the combustion engine is off. If not, the method 270 may continue to monitor the combustion engine is off at processing block 276. If the combustion engine has been turned off by an auto start-stop controller, illustrated processing block 280 executes. Processing block 280 obtains sensor data and/or V2X data as described herein. Processing block 282 controls external speakers based on the obtained data to simulate one or more combustion engine sounds of vehicle idling. Processing block 284 determines whether the engine is turned on. If the engine is turned on, processing block 276 executes. Otherwise, processing block 282 continues to execute.

In some embodiments, method 270 may also include selection of different types of sounds. For example, a menu may be presented to the user to present a plurality of sound choices to the user. The driver may select a sound from the menu to be emitted. It will be understood that the selection of different types of sounds may be implemented in any of the embodiments described herein.

Figure 14A:
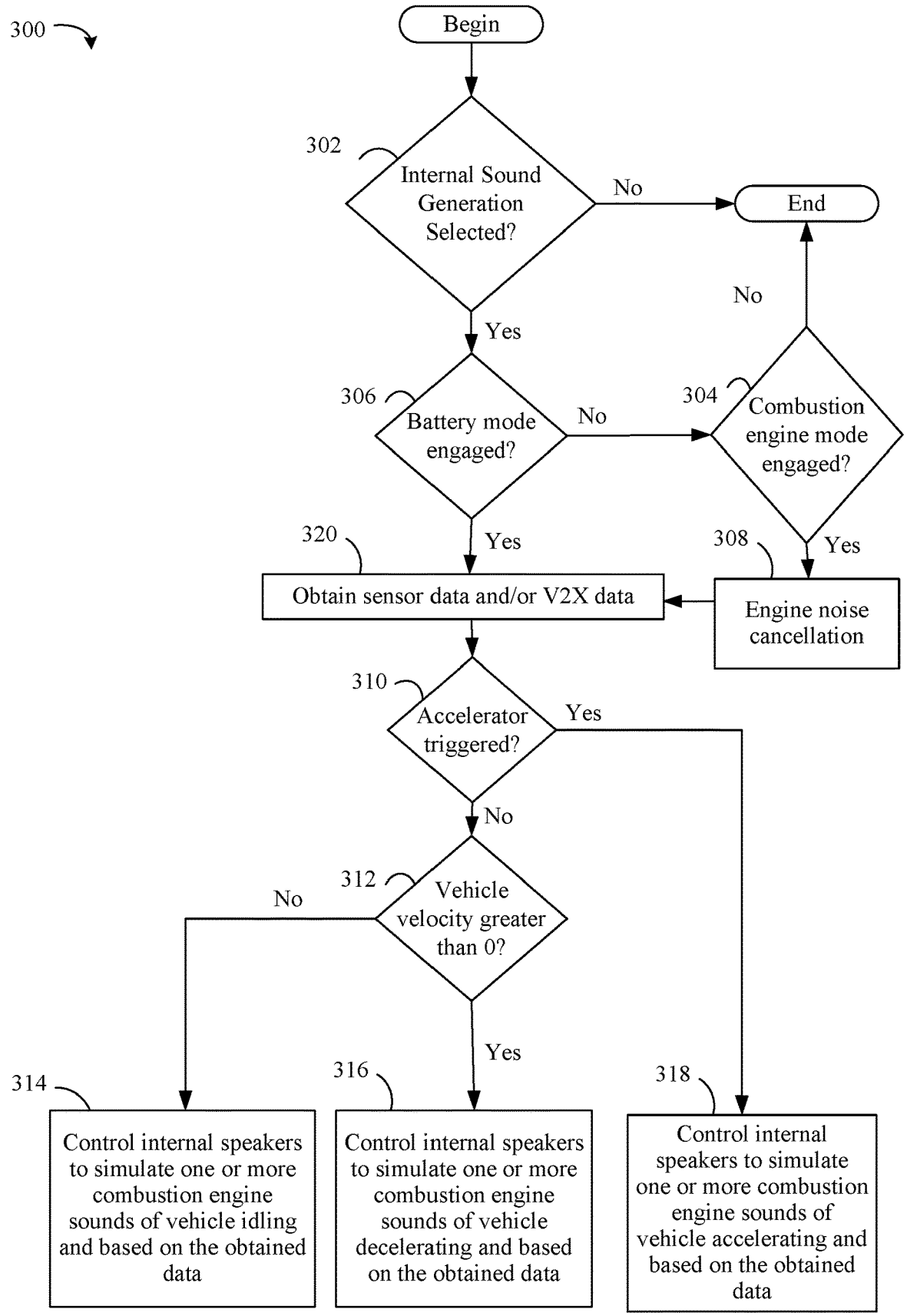
FIG. 14A is a flowchart of an example of a method of controlling internal sound emission when a sound generation mode is set to a hybrid mode according to an embodiment.

FIG. 14A shows a method 300 of controlling internal sound emission when a sound generation mode is set to a hybrid mode. The method 300 may generally be implemented in a vehicle's audio control system such as, for example, the audio controller 116 (FIG. 1) and/or the control system 150 (FIG. 2), and may be readily substituted for block 218 of FIG. 10. In an embodiment, the method 300 is implemented in logic instructions (e.g., software), configurable logic, fixed-functionality hardware logic, etc., or any combination thereof.

Illustrated processing block 302 determines whether an internal sound generation option is selected. For example, in some embodiments a driver of the vehicle may select to not have internal sound generation. If so, the method 300 may end. If the driver selects the execution of the internal sound generation, illustrated processing block 306 may determine if a battery mode is engaged. If the battery mode is engaged, the hybrid vehicle has turned off a combustion engine and is generating power from batteries. If the battery mode is not engaged, processing block 304 may determine if a combustion engine mode is engaged. If the combustion engine mode is engaged, the combustion engine is actuated (e.g., turned on), and processing block 308 cancels noise from outside a cabin of the hybrid vehicle. If illustrated processing block 304 determines that the combustion engine mode is not engaged, the method 300 may end.

If processing block 306 detects that the battery mode is engaged or after processing block 308 executes, processing block 320 obtains sensor data and/or V2X data. Processing block 310 may determine whether an accelerator of the hybrid vehicle is triggered to increase power provided from the batteries or combustion engine. If so, illustrated processing block 318 controls, based on the obtained data, internal speakers of the hybrid vehicle to simulate one or more combustion engine sounds of a vehicle accelerating.

Otherwise, processing block 312 determines if the hybrid vehicle's velocity is greater than zero. If so, processing block 316 controls the internal speakers, based on the obtained data, to simulate one or more combustion engine sounds of a vehicle decelerating. If the velocity is not greater than zero, processing block 314 controls, based on the obtained data, the internal speakers to simulate one or more combustion engine sounds of a vehicle idling.

In some embodiments, method 300 may also include selection of different types of sounds. For example, a menu may be presented to the user to present a plurality of sound choices to the user. The driver may select a sound from the menu to be emitted.

Figure 14B:
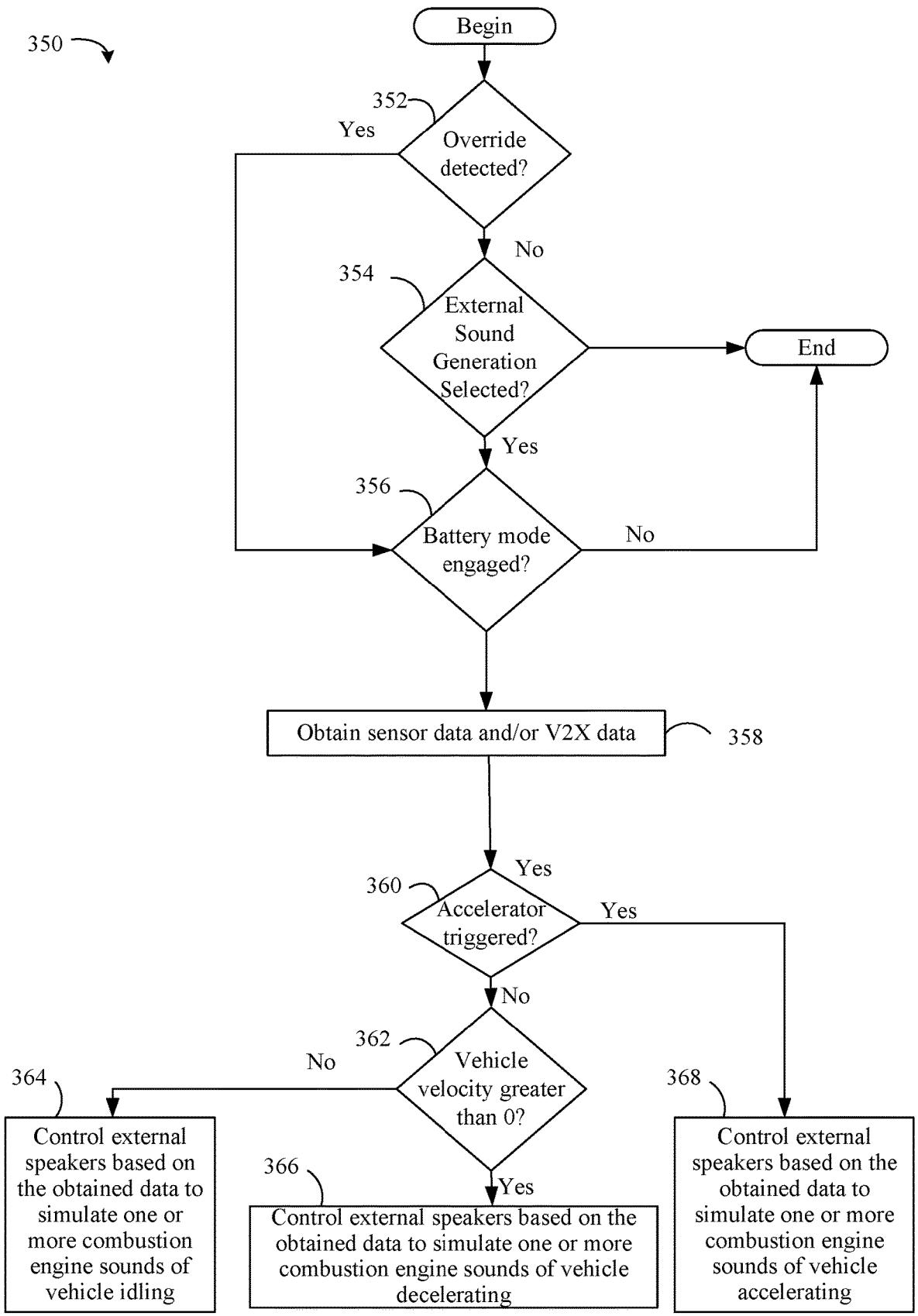
FIG. 14B is a flowchart of an example of a method of controlling external sound emission when a sound generation mode is set to a hybrid mode according to an embodiment.

FIG. 14B shows a method 350 of controlling external sound emission when a sound generation mode is set to a hybrid mode. The method 300 may generally be implemented in a vehicle's audio control system such as, for example, the audio controller 116 (FIG. 1) and/or the control system 150 (FIG. 2), and may be readily substituted for block 218 of FIG. 10 and operate in conjunction with method 350 (FIG. 12A). In an embodiment, the method 350 is implemented in logic instructions (e.g., software), configurable logic, fixed-functionality hardware logic, etc., or any combination thereof.

Illustrated processing block 352 detects whether an override is present. An override may mean that external sound generation cannot be overridden due to safety or to comply with laws. The override may be set remotely by a third party in some embodiments (e.g., remotely to the vehicle). If the override is detected, the method 350 proceeds to illustrated processing block 356. Otherwise, processing block 354 executes.

Illustrated processing block 354 determines whether an external sound generation option is selected. For example, in some embodiments a driver of the vehicle may select to not have external sound generation. If so, the method 350 may end.

If the driver selects the execution of the external sound generation, illustrated processing block 356 may determine if a battery mode is engaged. If the battery mode is engaged, the hybrid vehicle has turned off the combustion engine and is generating power from the batteries. If the battery mode is not engaged, the method 350 may end.

If processing block 356 detects that the battery mode is engaged, processing block 358 executes and obtains sensor and/or V2X data. Processing block 360 determines whether an accelerator of the hybrid vehicle is triggered to increase power provided from the batteries. If so, illustrated processing block 368 controls, based on the obtained data, external speakers of the hybrid vehicle to simulate one or more combustion engine sounds of a vehicle accelerating.

Otherwise, processing block 362 determines if the hybrid vehicle's velocity is greater than zero. If so, processing block 366 controls, based on the obtained data, the external speakers to simulate one or more combustion engine sounds of a vehicle decelerating. If the velocity is not greater than zero, processing block 364 controls, based on the obtained data, the external speakers to simulate one or more combustion engine sounds of a vehicle idling.

In some embodiments, method 350 may also include selection of different types of sounds. For example, a menu may be presented to the user to present a plurality of sound choices to the user. The driver may select a sound from the menu to be emitted.

Figure 15A:
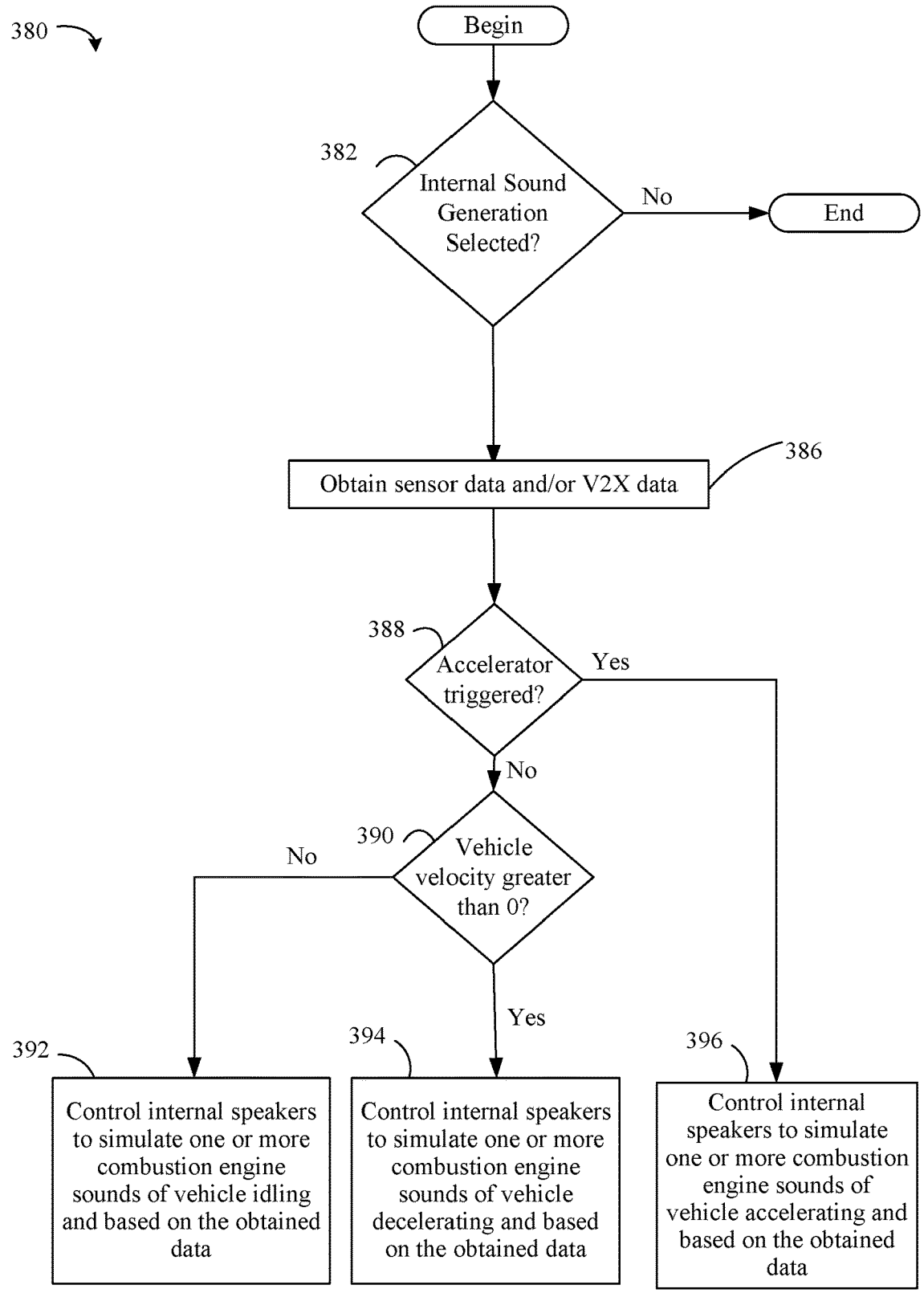
FIG. 15A is a flowchart of an example of a method of controlling internal sound emission when a vehicle lacks a combustion engine according to an embodiment.

FIG. 15A shows a method 380 of controlling internal sound emission when a sound generation mode is set to an electric or fuel cell vehicle mode (e.g., any vehicle that lacks a combustion engine). The method 380 may generally be implemented in a vehicle's audio control system such as, for example, the audio controller 116 (FIG. 1) and/or the control system 150 (FIG. 2), and may be readily substituted for block 216 of FIG. 10. In an embodiment, the method 380 is implemented in logic instructions (e.g., software), configurable logic, fixed-functionality hardware logic, etc., or any combination thereof.

Illustrated processing block 382 determines whether an internal sound generation option is selected. For example, in some embodiments a driver of the vehicle may select to not have internal sound generation. If so, the method 380 may end. If the combustion engine mode is engaged, the combustion engine is actuated (e.g., turned on), and processing block 308 cancels noise from outside a cabin of the hybrid vehicle. Otherwise, the method 300 may end.

Illustrated processing block 386 obtains sensor data and/or V2X data. Processing block 388 determines whether an accelerator of the vehicle is triggered to increase power provided from the batteries or fuel cells. If so, illustrated processing block 396 controls, based on the obtained data, internal speakers of the vehicle to simulate one or more combustion engine sounds of a vehicle accelerating.

Otherwise, processing block 390 determines if the hybrid vehicle's velocity is greater than zero. If so, processing block 394 controls, based on the obtained data, the internal speakers to simulate one or more combustion engine sounds of a vehicle decelerating. If the velocity is not greater than zero, processing block 392 controls the internal speakers, based on the obtained data, to simulate one or more combustion engine sounds of vehicle idling and based on the sensor data.

In some embodiments, method 380 may also include selection of different types of sounds. For example, a menu may be presented to the user to present a plurality of sound choices to the user. The driver may select a sound from the menu to be emitted.

Figure 15B:
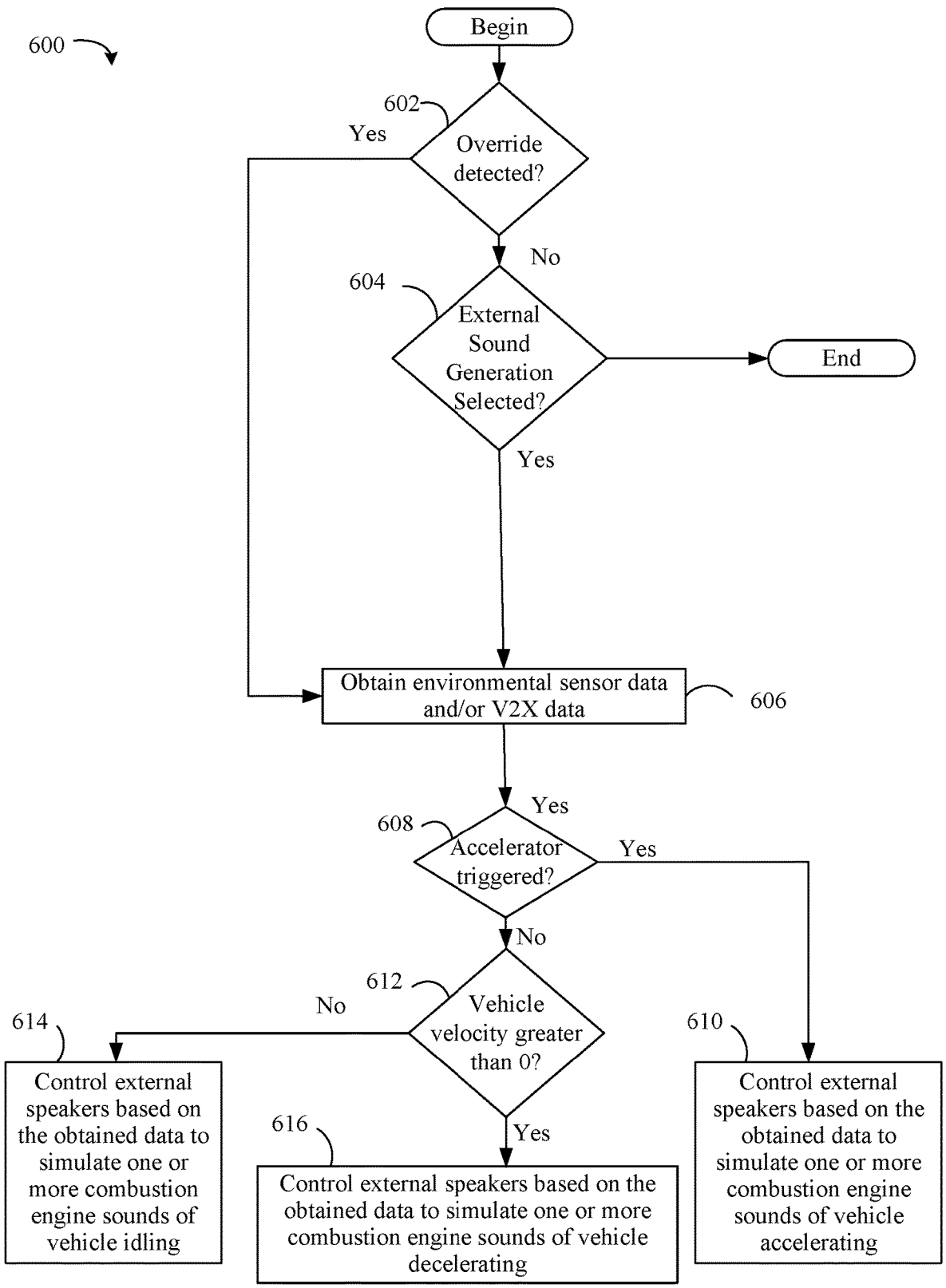
FIG. 15B is a flowchart of an example of a method of controlling external sound emission when a vehicle lacks a combustion engine according to an embodiment.

FIG. 15B shows a method 600 of controlling external sound emission when a sound generation mode is set to an electric or fuel cell vehicle mode (e.g., any vehicle that lacks a combustion engine). The method 600 may generally be implemented in a vehicle's audio control system such as, for example, the audio controller 116 (FIG. 1) and/or the control system 150 (FIG. 2), and may be readily substituted for block 216 of FIG. 10 to operate in conjunction with method 380. In an embodiment, the method 380 is implemented in logic instructions (e.g., software), configurable logic, fixed-functionality hardware logic, etc., or any combination thereof.

Illustrated processing block 602 detects whether an override is present. An override may mean that external sound generation cannot be overridden due to safety or to comply with laws. The override may be set remotely by a third party in some embodiments (e.g., remotely to the vehicle). If the override is detected, the method 600 proceeds to illustrated processing block 606. Otherwise, processing block 604 executes.

Illustrated processing block 604 determines whether an external sound generation option is selected. For example, in some embodiments a driver of the vehicle may select to not have external sound generation. If so, the method 600 may end.

If the driver selects the execution of the external sound generation, illustrated processing block 606 obtains sensor data and/or V2X data. Processing block 608 determines whether an accelerator of the vehicle is triggered to increase power provided from the batteries or fuel cells. If so, illustrated processing block 610 controls, based on the obtained data, external speakers of the vehicle to simulate one or more combustion engine sounds of a vehicle accelerating.

Otherwise, processing block 612 determines if the vehicle's velocity is greater than zero. If so, processing block 616 controls, based on the obtained data, the external speakers to simulate one or more combustion engine sounds of a vehicle decelerating. If the velocity is not greater than zero, processing block 614 controls, based on the obtained data, the external speakers to simulate one or more combustion engine sounds of vehicle idling.

In some embodiments, method 600 may also include selection of different types of sounds. For example, a menu may be presented to the user to present a plurality of sound choices to the user. The driver may select a sound from the menu to be emitted.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A first vehicle comprising:
   an internal audio system to project sounds to a cabin of the first vehicle;
   an external audio system to project sounds away from the first vehicle; and
   an audio controller that includes logic to:
      control a first sound to be emitted from one or more of the internal audio system or the external audio system based on one or more operating conditions associated with the first vehicle, and an environmental condition,
      detect ambient noise,
      conduct an identification that a second sound in the ambient noise is emitted by a second vehicle different from the first vehicle, and
      in response to the identification, determine whether to adjust the first sound based on the second sound.

2. The first vehicle of claim 1, wherein the logic is to:
   identify a person;
   categorize the person into a high-risk category;
   adjust one or more characteristics of the first sound based on the categorization of the person into the high-risk category; and
   control the external audio system so that the external audio system is to emit the first sound.

3. The first vehicle of claim 1, wherein the logic is to:
   identify an object;
   determine a distance between the object and the first vehicle;
   determine one or more characteristics of the first sound based on the distance; and
   control the external audio system so that the external audio system is to emit the first sound.

4. The first vehicle of claim 1, wherein the logic is to:
   identify an object;
   determine a position of the object relative to the first vehicle;
   prioritize one or more first speakers of the external audio system relative to one or more second speakers of the external audio system based on the position of the object relative to the first vehicle; and
   control the one or more first speakers so that the one or more first speakers are to emit the first sound.

5. The first vehicle of claim 1, wherein the logic is to:
   identify a weather condition; and
   determine one or more characteristics of the first sound based on the weather condition.

6. The first vehicle of claim 1, wherein the logic is to:
   identify a location of the second sound;
   control, based on the location, the external audio system to avoid having one or more first speakers of the external audio system from emitting the first sound; and
   control, based on the location, the external audio system to cause one or more second speakers of the external audio system to emit the first sound.

7. The first vehicle of claim 1, wherein the logic is to:
   cause the internal audio system to emit the first sound;
   identify a condition associated with an interrupt associated with a third sound;
   in response to a selection of the interrupt by a user, cause cessation of emission of the first sound from the internal audio system and cause the third sound to be emitted from the internal audio system; and
   in response to a rejection of the interrupt by the user, avoid causation of emission of the third sound by the internal audio system so that the first sound continues to be emitted from the internal audio system.

8. The first vehicle of claim 1, wherein the logic is to:
   in response to the identification, determine whether characteristics of the second sound are similar to characteristics of the first sound;
   when the characteristics of the second sound are not similar to the characteristics of the first sound, avoid adjustment to the characteristics of the first sound to maintain the characteristics of the first sound; and when the characteristics of the second sound are similar to the characteristics of the first sound, adjust the characteristics of the first sound.

9. At least one computer readable storage medium comprising a set of instructions, which when executed by an audio controller of a first vehicle, cause the audio controller to:
identify one or more operating conditions associated with the first vehicle;
identify an environmental condition associated with the first vehicle;
control a first sound to be emitted from one or more of an internal audio system or an external audio system based on the one or more operating conditions and the environmental condition, wherein the internal audio system is to project sounds to a cabin of the first vehicle, further wherein the external audio system is to project sounds away from the first vehicle;
detect ambient noise;
conduct an identification that a second sound in the ambient noise is emitted by a second vehicle different from the first vehicle; and
in response to the identification, determine whether to adjust the first sound based on the second sound.

10. The at least one computer readable storage medium of claim 9, wherein the instructions, when executed, cause the audio controller to:
identify a person;
categorize the person into a high-risk category;
determine one or more characteristics of the first sound based on the categorization of the person into the high-risk category; and
control the external audio system so that the external audio system is to emit the first sound.

11. The at least one computer readable storage medium of claim 9, wherein the instructions, when executed, cause the audio controller to:
identify an object;
determine a distance between the object and the first vehicle;
determine one or more characteristics of the first sound based on the distance; and
control the external audio system so that the external audio system is to emit the first sound.

12. The at least one computer readable storage medium of claim 9, wherein the instructions, when executed, cause the audio controller to:
identify an object;
determine a position of the object relative to the first vehicle;
prioritize one or more first speakers of the external audio system relative to one or more second speakers of the external audio system based on the position of the object relative to the first vehicle; and
control the one or more first speakers so that the one or more first speakers are to emit the first sound.

13. The at least one computer readable storage medium of claim 9, wherein the instructions, when executed, cause the audio controller to:
identify a weather condition; and
determine one or more characteristics of the first sound based on the weather condition.

14. The at least one computer readable storage medium of claim 9, wherein the instructions, when executed, cause the audio controller to:

identify a location of the second sound;
control, based on the location, the external audio system to avoid having one or more first speakers of the external audio system from emitting the first sound; and
control, based on the location, the external audio system to cause one or more second speakers of the external audio system to emit the first sound.

15. The at least one computer readable storage medium of claim 9, wherein the instructions, when executed, cause the audio controller to:
cause the internal audio system to emit the first sound;
identify a condition associated with an interrupt associated with a third sound;
in response to a selection of the interrupt by a user, cause cessation of emission of the first sound from the internal audio system and cause the third sound to be emitted from the internal audio system; and
in response to a rejection of the interrupt by the user, avoid causation of emission of the third sound by the internal audio system so that the first sound continues to be emitted from the internal audio system.

16. The at least one computer readable storage medium of claim 9, wherein the instructions, when executed, cause the audio controller to:
in response to the identification, determine whether characteristics of the second sound are similar to characteristics of the first sound;
when the characteristics of the second sound are not similar to the characteristics of the first sound, avoid adjustment to the characteristics of the first sound to maintain the characteristics of the first sound; and
when the characteristics of the second sound are similar to the characteristics of the first sound, adjust the characteristics of the first sound.

17. A method of controlling audio emission with an audio controller of a first vehicle, the method comprising:
identifying one or more operating conditions associated with the first vehicle;
identifying an environmental condition associated with the first vehicle;
controlling a first sound to be emitted from one or more of an internal audio system or an external audio system based on the one or more operating conditions and the environmental condition, wherein the internal audio system is to project sounds to a cabin of the first vehicle, further wherein the external audio system is to project sounds away from the first vehicle;
detecting ambient noise;
conducting an identification that a second sound in the ambient noise is emitted by a second vehicle different from the first vehicle; and
in response to the identification, determining whether to adjust the first sound based on the second sound.

18. The method of claim 17, further comprising:
identifying a person;
categorizing the person into a high-risk category;
determining one or more characteristics of the first sound based on the categorization of the person into the high-risk category; and
controlling the external audio system so that the external audio system is to emit the first sound.

19. The method of claim 17, further comprising:
identifying an object;
determining a distance between the object and the first vehicle;
determining one or more characteristics of the first sound based on the distance; and controlling the external audio system so that the external audio system is to emit the first sound.

20. The method of claim 17, further comprising:

in response to the identification, determining whether characteristics of the second sound are similar to characteristics of the first sound;

when the characteristics of the second sound are not similar to the characteristics of the first sound, avoiding adjustment to the characteristics of the first sound to maintain the characteristics of the first sound; and when the characteristics of the second sound are similar to the characteristics of the first sound, adjusting the characteristics of the first sound.

* * * * *